United States Patent
Yamashita et al.

(10) Patent No.: US 10,471,346 B2
(45) Date of Patent: Nov. 12, 2019

(54) INFORMATION PROCESSING SYSTEM, NON-TRANSITORY STORAGE MEDIUM HAVING STORED THEREIN INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Yuta Yamashita, Kyoto (JP); Tatsuya Kurihara, Kyoto (JP); Shigetoshi Gohara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/987,178

(22) Filed: May 23, 2018

(65) Prior Publication Data

US 2018/0345131 A1 Dec. 6, 2018

(30) Foreign Application Priority Data

Jun. 2, 2017 (JP) .................... 2017-109998

(51) Int. Cl.
*A63F 13/25* (2014.01)

(52) U.S. Cl.
CPC .................... *A63F 13/25* (2014.09)

(58) Field of Classification Search
CPC ............................... A63F 2300/1037
See application file for complete search history.

(56) References Cited

U.S. PATENT DOCUMENTS

| | | | | |
|---|---|---|---|---|
| 5,734,373 A | * | 3/1998 | Rosenberg | A63F 13/06 345/161 |
| 6,645,076 B1 | | 11/2003 | Sugai | |
| 6,752,716 B1 | | 6/2004 | Nishimura | |
| 6,864,877 B2 | | 3/2005 | Braun et al. | |
| 7,070,507 B2 | | 7/2006 | Nishiumi | |
| 7,733,637 B1 | | 6/2010 | Lam | |
| 8,059,089 B2 | | 11/2011 | Daniel | |
| 8,972,617 B2 | | 3/2015 | Hirschman | |
| 9,118,750 B2 | | 8/2015 | Vossoughi | |
| 9,126,119 B2 | | 9/2015 | Joynes | |
| 9,529,447 B2 | | 12/2016 | Hodges | |
| 9,711,980 B2 | | 7/2017 | Hodges | |

(Continued)

FOREIGN PATENT DOCUMENTS

| | | |
|---|---|---|
| EP | 2 810 699 | 12/2014 |
| GB | 2508137 | 5/2014 |

(Continued)

OTHER PUBLICATIONS

Notice of Reasons for Refusal dated Apr. 10, 2019, issued in Japanese Application No. 2017-109998 (4 pages).

(Continued)

*Primary Examiner* — Steven J Hylinski
(74) *Attorney, Agent, or Firm* — Nixon & Vanderhye PC

(57) ABSTRACT

Provided is an example system in which a player character provided in a virtual space is caused to perform a motion including a first state and a second state, by a user operating a left controller and a right controller. When the player character is in the first state, the left controller vibrates more strongly than the right controller. When the player character is in the second state, the right controller vibrates more strongly than the left controller.

28 Claims, 22 Drawing Sheets

(56) References Cited

U.S. PATENT DOCUMENTS

| | | |
|---|---|---|
| 9,753,537 B2 | 9/2017 | Obana |
| 9,808,713 B1 | 11/2017 | Townley |
| 9,833,702 B2 | 12/2017 | Obana et al. |
| 9,855,498 B2 | 1/2018 | Townley |
| 10,062,247 B2 | 8/2018 | Obana et al. |
| 10,135,412 B2 | 11/2018 | Obana et al. |
| 10,286,310 B2 | 5/2019 | Obana et al. |
| 10,335,676 B2 | 7/2019 | Gohara |
| 2002/0080112 A1 | 6/2002 | Braun et al. |
| 2002/0155890 A1 | 10/2002 | Ha |
| 2004/0023719 A1 | 2/2004 | Hussaini |
| 2006/0046843 A1 | 3/2006 | Nakajima |
| 2006/0290662 A1* | 12/2006 | Houston ............ A63F 13/06 345/156 |
| 2008/0155415 A1 | 6/2008 | Yoon et al. |
| 2009/0131171 A1 | 5/2009 | Miyazaki |
| 2010/0153845 A1 | 6/2010 | Gregorio et al. |
| 2010/0250815 A1 | 9/2010 | Street |
| 2010/0260996 A1 | 10/2010 | Chen |
| 2011/0053691 A1 | 3/2011 | Bryant |
| 2011/0134034 A1 | 6/2011 | Daniel |
| 2011/0260969 A1 | 10/2011 | Workman |
| 2011/0260996 A1 | 10/2011 | Henricson |
| 2012/0150431 A1 | 6/2012 | Ooka |
| 2012/0162113 A1 | 6/2012 | Lee |
| 2013/0095925 A1 | 4/2013 | Xu |
| 2013/0178285 A1 | 7/2013 | Joynes |
| 2013/0178290 A1 | 7/2013 | Joynes |
| 2013/0207792 A1 | 8/2013 | Lim et al. |
| 2013/0267322 A1 | 10/2013 | South |
| 2013/0281212 A1 | 10/2013 | Tsuchiya et al. |
| 2013/0318438 A1 | 11/2013 | Afshar |
| 2013/0342339 A1 | 12/2013 | Kiefer |
| 2014/0056461 A1 | 2/2014 | Afshar |
| 2014/0184508 A1 | 7/2014 | Tamasi |
| 2014/0205260 A1 | 7/2014 | Lacroix |
| 2014/0206451 A1 | 7/2014 | Helmes |
| 2014/0210756 A1 | 7/2014 | Lee |
| 2014/0247246 A1 | 9/2014 | Maus |
| 2014/0248957 A1 | 9/2014 | Eck et al. |
| 2014/0274394 A1 | 9/2014 | Willis |
| 2014/0341386 A1 | 11/2014 | Cimaz |
| 2015/0084900 A1 | 3/2015 | Hodges |
| 2015/0160772 A1 | 6/2015 | Takeuchi |
| 2015/0205328 A1 | 7/2015 | Lin |
| 2015/0209668 A1 | 7/2015 | Obana |
| 2015/0263685 A1 | 9/2015 | Obana |
| 2015/0323996 A1 | 11/2015 | Obana |
| 2015/0355711 A1 | 12/2015 | Rihn |
| 2015/0356838 A1 | 12/2015 | Obana et al. |
| 2015/0356868 A1* | 12/2015 | Cuende Alonso ..... G01C 21/36 382/104 |
| 2016/0192067 A1 | 6/2016 | Obana |
| 2016/0209968 A1 | 7/2016 | Taylor |
| 2016/0231773 A1 | 8/2016 | Inoue |
| 2017/0176202 A1 | 6/2017 | Anderson |
| 2017/0199569 A1 | 7/2017 | Cruz-Hernandez |
| 2017/0361222 A1 | 12/2017 | Tsuchiya et al. |
| 2018/0078422 A1 | 3/2018 | Dierenbach |
| 2018/0181201 A1 | 6/2018 | Grant |
| 2018/0203509 A1 | 7/2018 | Yamano et al. |
| 2018/0203510 A1 | 7/2018 | Yamano et al. |
| 2019/0039092 A1 | 2/2019 | Kim et al. |

FOREIGN PATENT DOCUMENTS

| | | |
|---|---|---|
| JP | 2000-245964 | 9/2000 |
| JP | 2003-199974 | 7/2003 |
| JP | 2003-275464 | 9/2003 |
| JP | 2004-57654 | 2/2004 |
| JP | 2006-68210 | 3/2006 |
| JP | 2009-061161 | 3/2009 |
| JP | 2013-164845 | 8/2013 |
| JP | 2013-236909 | 11/2013 |
| JP | 2015-141647 | 8/2015 |
| JP | 2015-172899 | 10/2015 |
| JP | 2015-232786 | 12/2015 |
| JP | 2015-232880 | 12/2015 |
| JP | 2016-123513 | 7/2016 |
| WO | 2011/043292 | 4/2011 |
| WO | 2013/049248 | 4/2013 |
| WO | 2017/043400 | 3/2017 |
| WO | 2018/016107 | 1/2018 |

OTHER PUBLICATIONS

Steam, "A Different Kind of Gamepad", http://store.steampowered.com/livingroom/SteamController/, printed on Dec. 19, 2014, 10 pages.

Immersion, Patent Markings, retrieved Aug. 7, 2018, 2 pages. https://www.immersion.com/legal/trademarks-and-patent-markings/.

Notice of Reasons for Refusal dated Jul. 31, 2019, issued in Japanese Application No. 2017-109999 (4 pages).

* cited by examiner

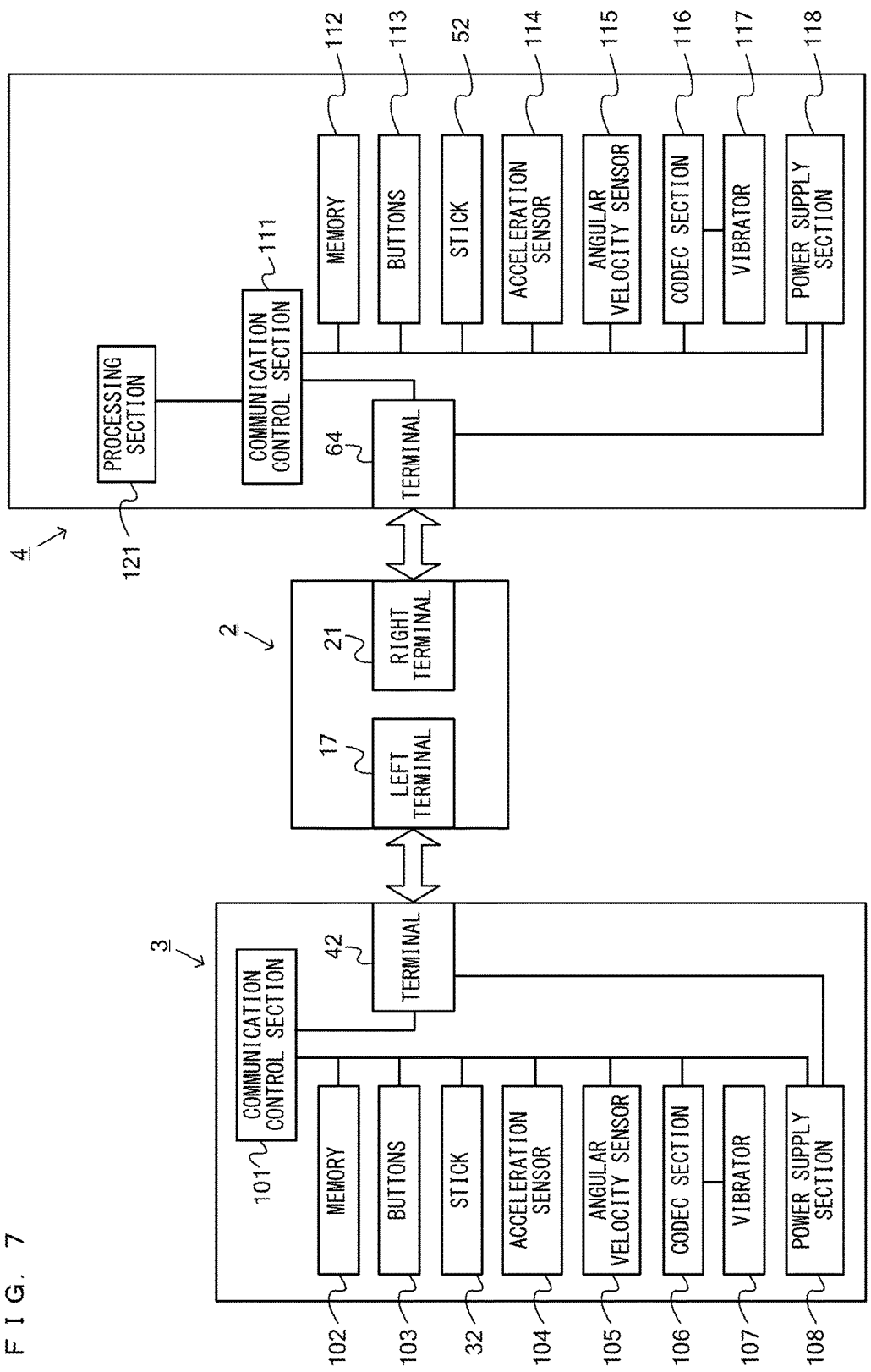
F I G. 7

FIG. 12
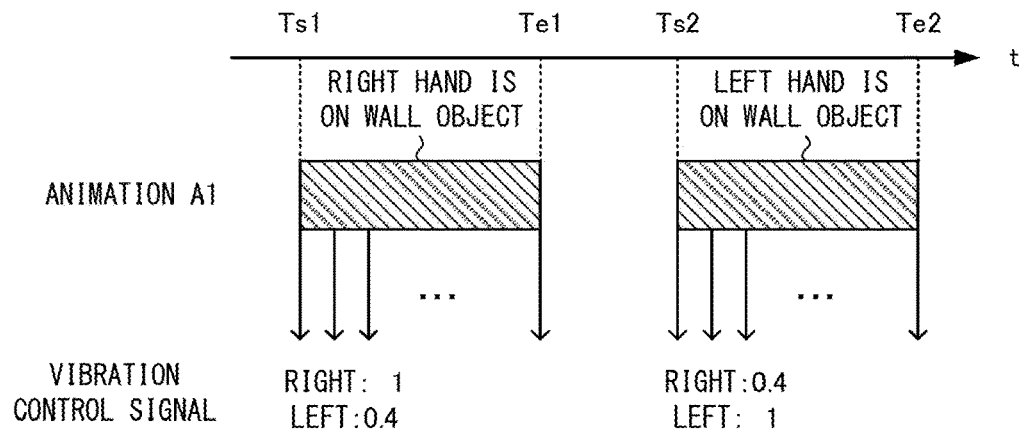
FIG. 13
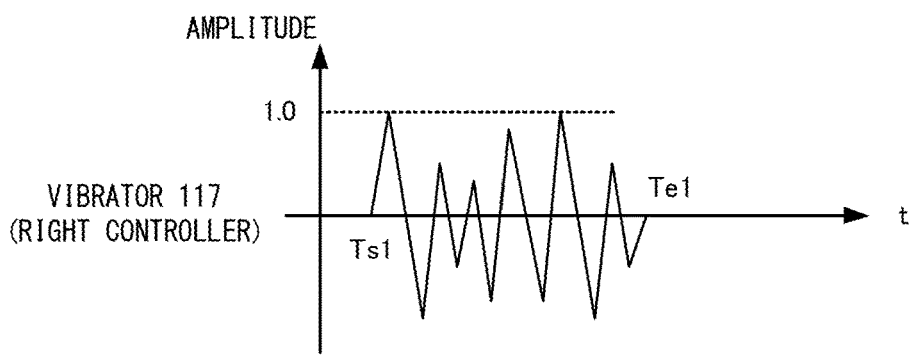
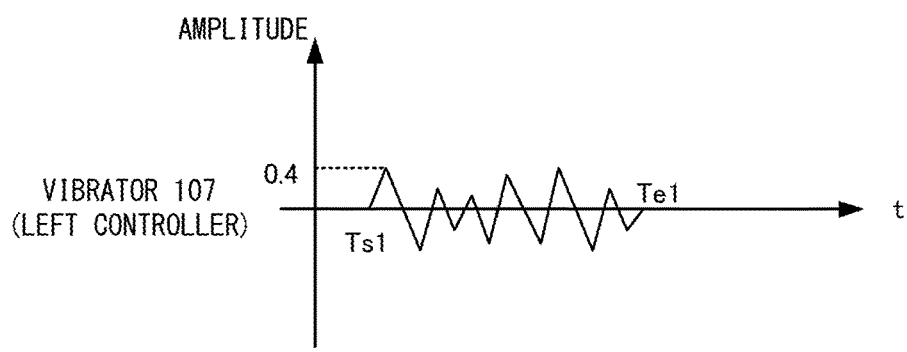

| GROUND OBJECT | VIBRATION PATTERN DATA |
|---|---|
| STONY | P31 |
| SANDY | P32 |
| BOGGY | P33 |

F I G. 2 0
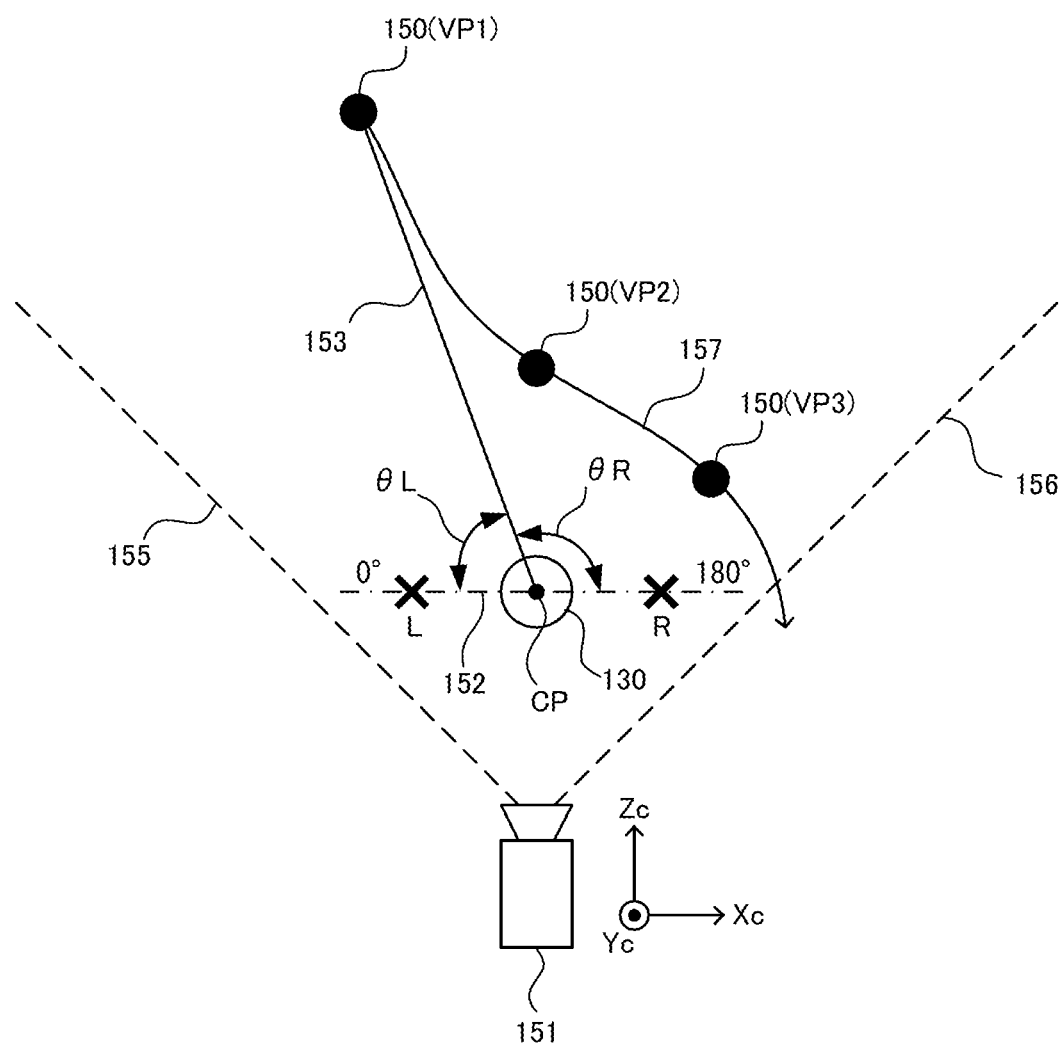

F I G. 2 1
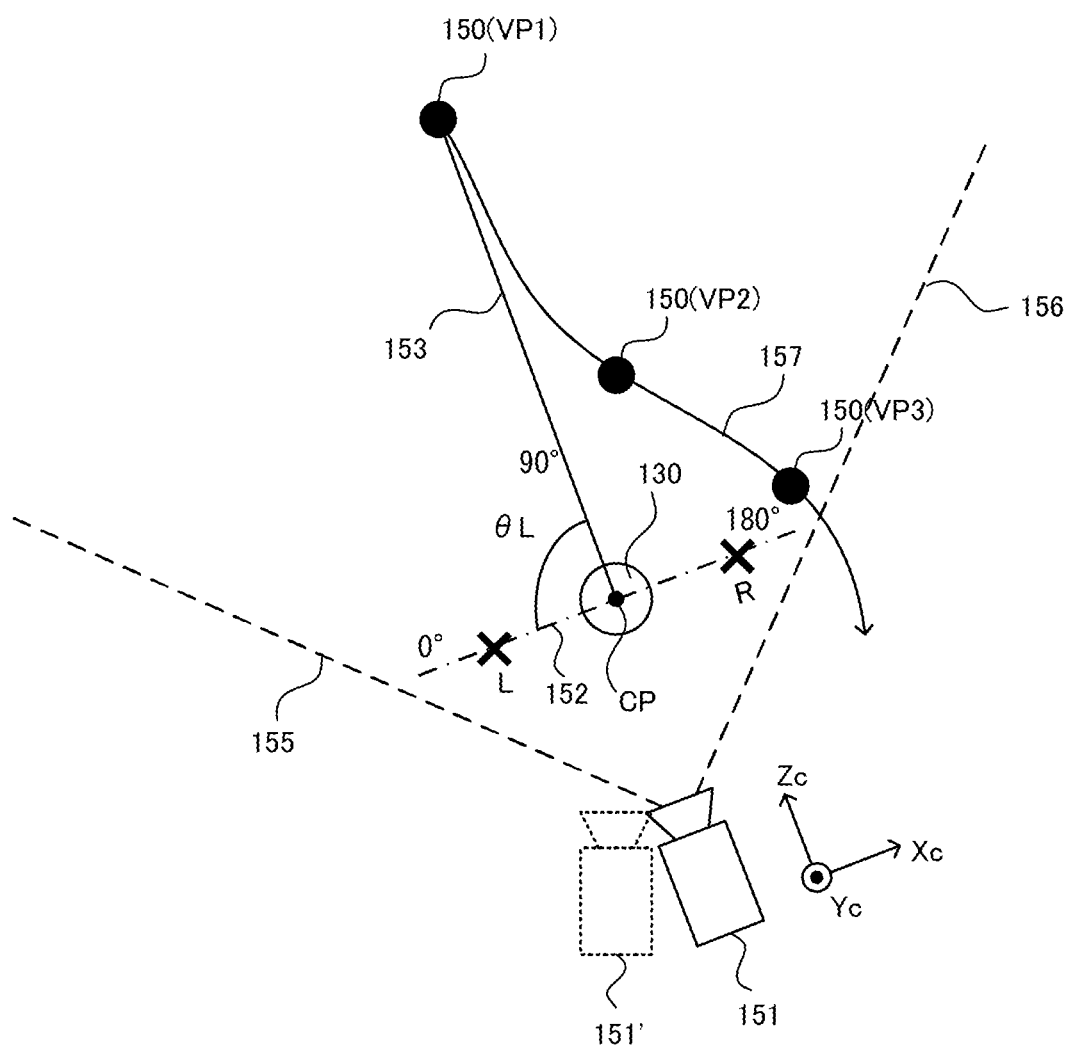

F I G. 2 2
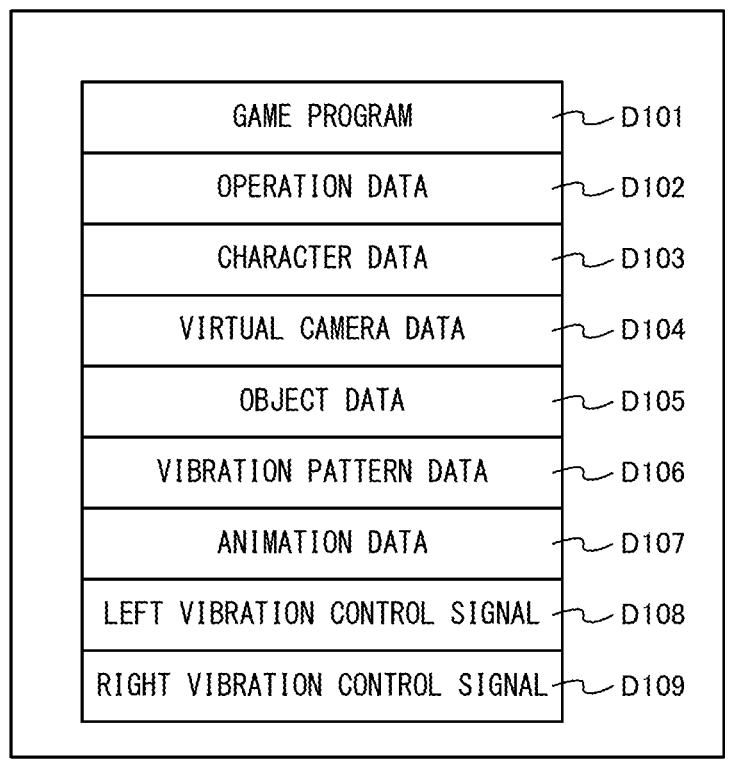

INFORMATION PROCESSING SYSTEM, NON-TRANSITORY STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

The disclosure of Japanese Patent Application No. 2017-109998, filed Jun. 2, 2017, is incorporated herein by reference.

FIELD

The present exemplary embodiment relates to an information processing system that causes a vibrator to vibrate, a non-transitory storage medium having stored therein the information processing program, an information processing apparatus, and an information processing method.

BACKGROUND AND SUMMARY

A system including a first vibrator and a second vibrator has conventionally been proposed. In the conventional system, the proportion of the vibration strength of the first vibrator to the vibration strength of the second vibrator is changed such that a vibration source is perceived.

However, in the conventional technique, the vibrations of the first and second vibrators allow perception or identification of the location of a virtual object, but not the motion of a virtual object.

Therefore, it is an object of the present exemplary embodiment to provide an information processing system that allows a user to perceive or feel a state of a motion of an operation object, through vibrations.

In order to achieve the object described above, the following configuration examples are exemplified.

An information processing system according to the present exemplary embodiment includes a first vibrator configured to vibrate with a strength based on a first vibration signal, a second vibrator configured to vibrate with a strength based on a second vibration signal, a vibration signal generator, and an operation object controller. The vibration signal generator generates the first vibration signal for causing the first vibrator to vibrate, and the second vibration signal for causing the second vibrator to vibrate. The operation object controller causes an operation object to perform a motion including a first state and a second state, in a virtual space, based on an operation performed by a user. When the operation object is in the first state of the motion, the vibration signal generator generates the first and second vibration signals such that the first vibrator vibrates more strongly than the second vibrator. When the operation object is in the second state of the motion, the vibration signal generator generates the first and second vibration signals such that the second vibrator vibrates more strongly than the first vibrator.

According to the above feature, when the operation object is in the first state, the first vibrator is allowed to vibrate more strongly than the second vibrator, and when the operation object is in the second state, the second vibrator is allowed to vibrate more strongly than the first vibrator. As a result, a user is allowed to recognize the state of the motion of the operation object, based on the vibrations of the first and second vibrators.

In another feature, in the motion, the operation object may alternately enter the first and second states.

According to the above feature, the first and second vibrators are allowed to alternately vibrate strongly, in synchronization with the motion of the operation object of alternately entering the first and second states.

Further, in another feature, the operation object controller may cause the operation object to be in the first or second state, according to at least one of a state of the virtual space, a state of the operation object, and an operation performed by the user.

According to the above feature, the first state or the second state can be selected according to the state of the virtual space or the operation object, or an operation performed by the user. For example, when the virtual camera is located at a first position, the operation object is allowed to perform the motion of entering the first state. When the virtual camera is located at a second position, the operation object is allowed to perform the motion of entering the second state.

Further, in another feature, the vibration signal generator may further generate the first and second vibration signals such that the first and second vibrators each vibrate with a strength corresponding to a positional relationship between a virtual vibration source provided in the virtual space and the operation object or a virtual camera.

According to the above feature, in addition to the vibration corresponding to the first or second state of the operation object, the vibration corresponding to the positional relationship can be generated. The first and second vibrators vibrate according to the positional relationship between the virtual vibration source and the operation object or the virtual camera. Therefore, a vibration corresponding to a location on a display of the virtual vibration source can be generated, and also, a vibration corresponding to a location of the virtual vibration source as viewed from the operation object can be generated. As a result, the user can recognize the state of the virtual space, from the vibrations of the first and second vibrators, and can also recognize the state of the operation object. For example, the user can recognize on which of the left and right sides of a screen the vibration source is located, and to which of the left and right of the operation object the vibration source is located.

Further, in another feature, when the first vibration signal generated based on the motion of the operation object and the first vibration signal generated based on the virtual vibration source are simultaneously generated, the vibration signal generator may combine the first vibration signals, and when the second vibration signal generated based on the motion of the operation object and the second vibration signal generated based on the virtual vibration source are simultaneously generated, the vibration signal generator may combine the second vibration signals.

According to the above feature, the vibration based on the motion of the operation object and the vibration based on the virtual vibration source can be combined.

Further, in another feature, the vibration signal generator may generate the first and second vibration signals varying according to a location in the virtual space of the operation object.

According to the above feature, a vibration varying according to the location in the virtual space of the operation object can be generated. For example, when a plurality of types of ground objects are provided in the virtual space, a vibration varying according to the type of a ground object on which the operation object is performing the motion can be generated.

Further, in another feature, the information processing system may further include a first operating portion and second operating portion. The first vibrator may be included in the first operating portion. The second vibrator may be included in the second operating portion. The operation object controller may control the operation object, based on an operation performed on the first operating portion and/or the second operating portion.

According to the above feature, the operation object is controlled based on an operation preformed on the first operating portion and/or the second operating portion, and the first and second vibrators can be caused to vibrate, based on the state of the motion of the operation object. As a result, the user can feel a vibration corresponding to an operation performed on the first operating portion and/or second operating portion.

Further, in another feature, the first operating portion may be operated by the left hand of the user, and the second operating portion may be operated by the right hand of the user. The operation object may be a player character object operated by the user. When an event occurs on a left portion of the player character object in the virtual space, the vibration signal generator may generate the first and second vibration signals such that the first vibrator vibrates more strongly than the second vibrator. When an event occurs on a right portion of the player character object in the virtual space, the vibration signal generator may generate the first and second vibration signals such that the second vibrator vibrates more strongly than the first vibrator.

According to the above feature, the left and right vibrators can be caused to vibrate according to a left-or-right state of the player character object. For example, when an event is occurring on the left hand of the player character object (e.g., a case where the left hand is on an upper end portion of a wall, a case where the left paw of a animal object is on a ground, etc.), the first operating portion operated by the user's left hand can be caused to vibrate more strongly.

Further, in another exemplary embodiment, an information processing program executable in the information processing system, or an information processing apparatus for executing the information processing program, may be provided. Further, in another exemplary embodiment, an information processing method for use in the information processing system may be provided.

According to the present exemplary embodiment, a user is allowed to recognize a state of a motion of an operation object, based on vibrations of a first vibrator and a second vibrator.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 7 is an example non-limiting block diagram showing examples of internal configurations of a main body apparatus 2, a left controller 3, and a right controller 4;

FIG. 12 is an example non-limiting diagram showing an example of timings of an animation displayed on a screen and vibration control signals output to left and right controllers 3 and 4;

FIG. 13 is an example non-limiting diagram showing an example of waveforms of vibrations based on vibration pattern data P1, i.e., vibration waveforms of vibrators 107 and 117 that are occurring when an animation A1 (right) is being displayed;

FIG. 20 is an example non-limiting diagram showing an example of a vibration object 150, a player character 130, and a virtual camera 151 that are provided in a virtual space, as viewed from above;

FIG. 21 is an example non-limiting diagram showing an example of a virtual space in which a vibration object 150, a player character 130, and a virtual camera 151 are provided, with the virtual camera 151 being turned around the player character 130, as viewed from above;

FIG. 22 is an example non-limiting diagram showing an example of data stored in a main body apparatus 2;

DETAILED DESCRIPTION OF NON-LIMITING EXAMPLE EMBODIMENTS

Figure 1:
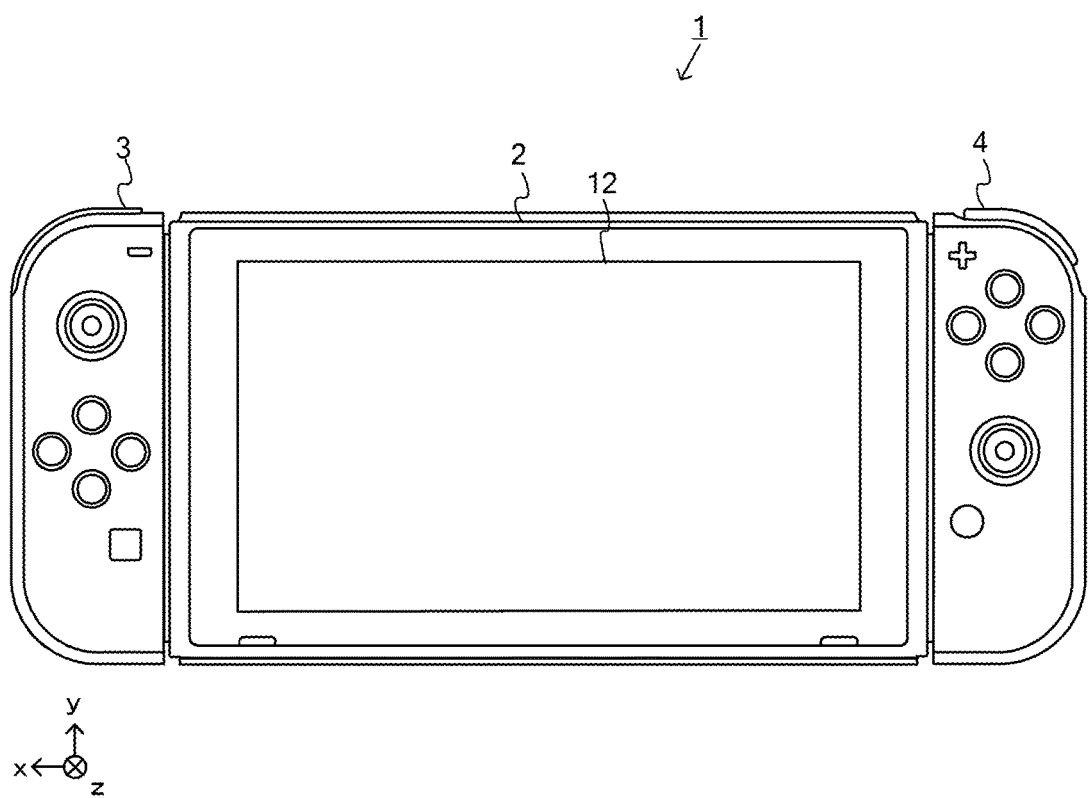
FIG. 1 is an example non-limiting diagram showing an example of a state in which a left controller 3 and a right controller 4 are attached to a main body apparatus 2.

A game system according to an example of an exemplary embodiment will now be described. An example of a game system 1 according to the exemplary embodiment includes a main body apparatus (an information processing apparatus that functions as a game apparatus main body in the exemplary embodiment) 2, a left controller 3, and a right controller 4. Each of the left and right controllers 3 and 4 is attachable to and detachable from the main body apparatus 2. That is, the game system 1 can be used as a unified apparatus obtained by attaching each of the left and right controllers 3 and 4 to the main body apparatus 2. Further, in the game system 1, the main body apparatus 2, the left controller 3, and the right controller 4 can also be used as separate bodies (see FIG. 2). In the description that follows, a hardware configuration of the game system 1 according to the exemplary embodiment is described, followed by a description of the control of the game system 1 according to the exemplary embodiment.

FIG. 1 is a diagram showing an example of the state in which the left and right controllers 3 and 4 are attached to the main body apparatus 2. As shown in FIG. 1, each of the left and right controllers 3 and 4 is attached to and unified with the main body apparatus 2. The main body apparatus 2 is for performing various processes (e.g., game processes) in the game system 1. The main body apparatus 2 includes a display 12. Each of the left and right controllers 3 and 4 includes operating portions with which a user provides inputs.

Figure 2:
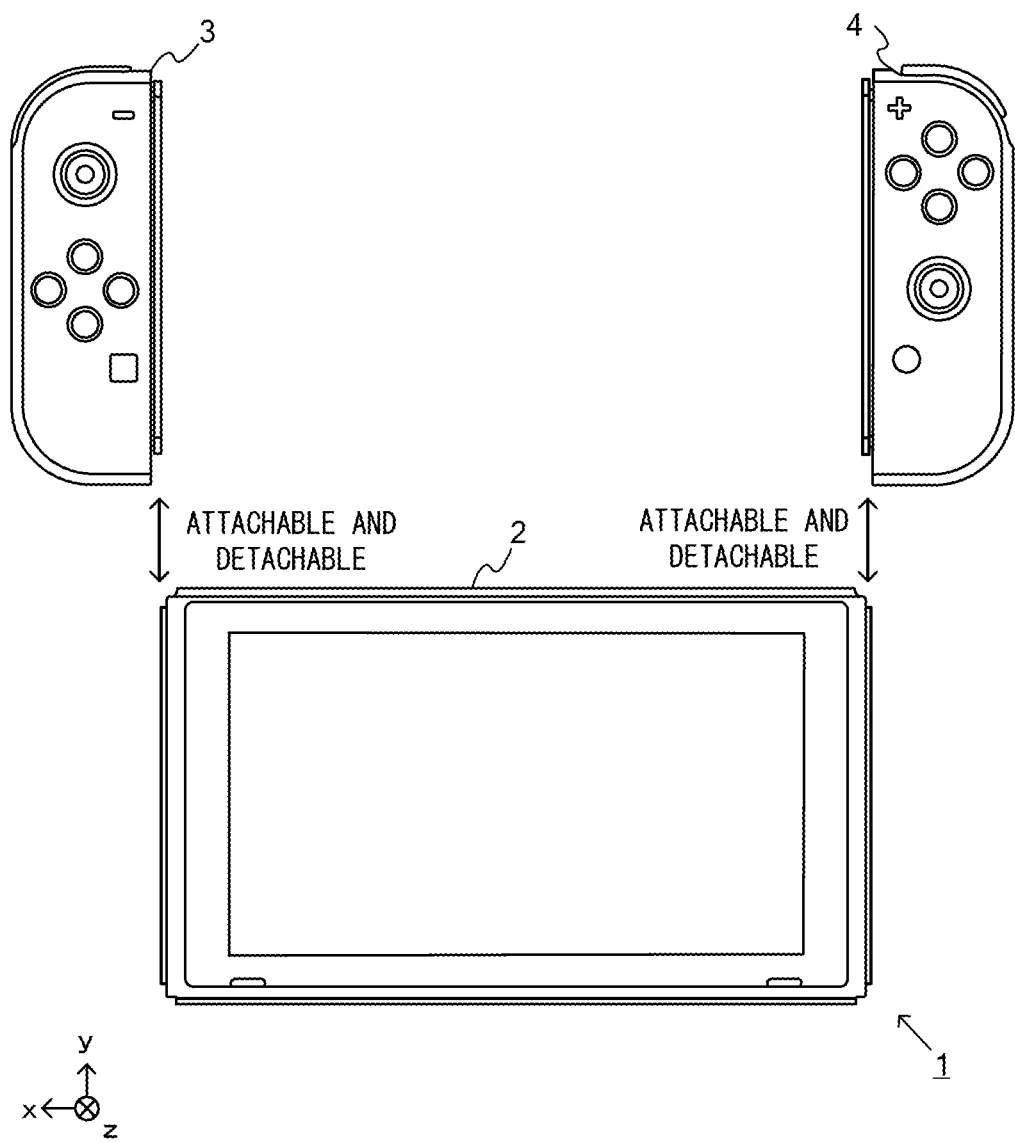
FIG. 2 is an example non-limiting diagram showing an example of a state in which each of left and right controllers 3 and 4 is detached from a main body apparatus 2.

FIG. 2 is a diagram showing an example of the state in which each of the left and right controllers 3 and 4 is detached from the main body apparatus 2. As shown in FIGS. 1 and 2, the left and right controllers 3 and 4 are attachable to and detachable from the main body apparatus 2. It should be noted that the left and right controllers 3 and 4 may also be hereinafter collectively referred to as "the controller" or "the controllers."

Figure 3:
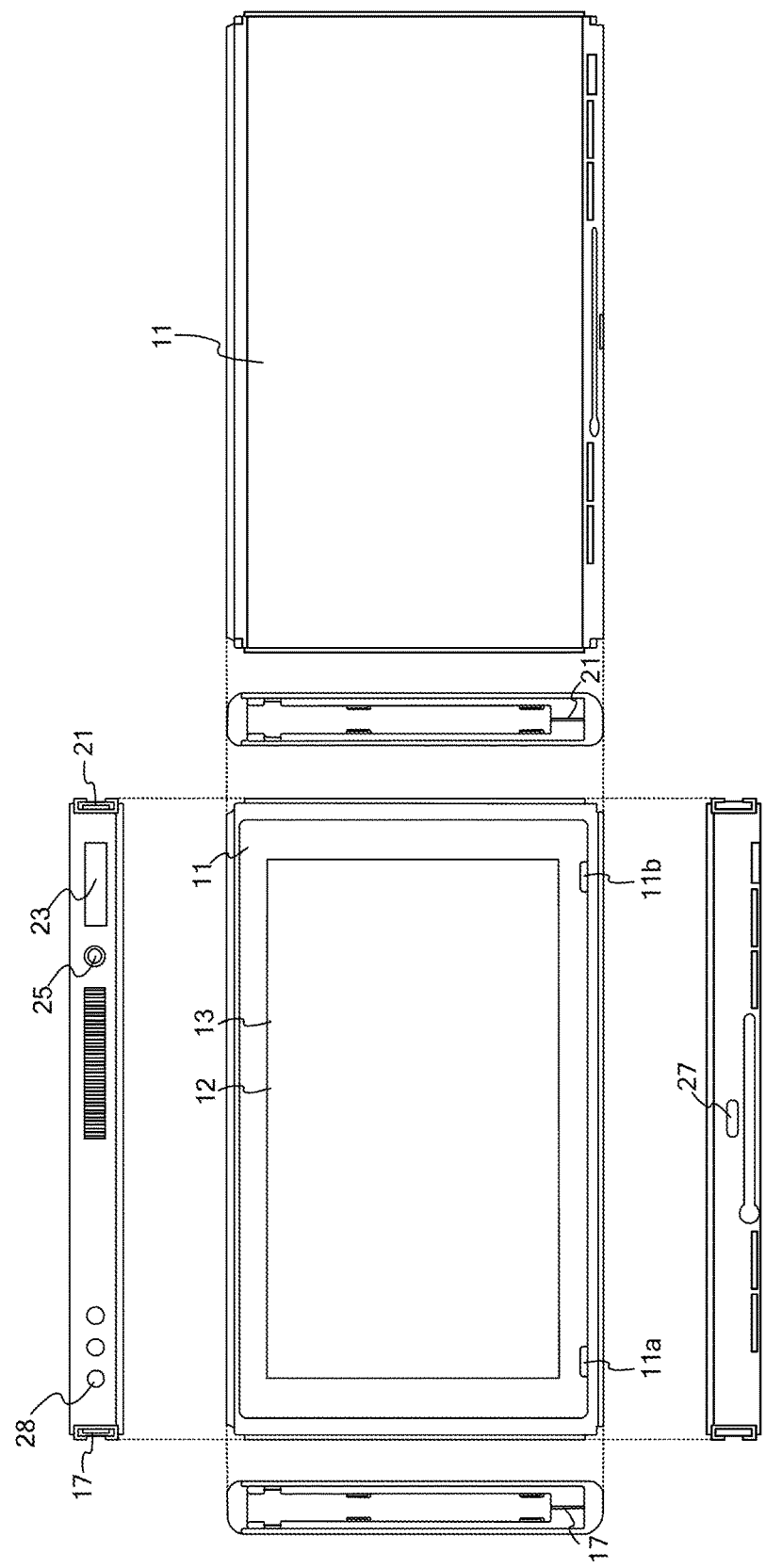
FIG. 3 is an example non-limiting diagram having six orthogonal views showing an example of a main body apparatus 2.

FIG. 3 is a diagram having six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the housing 11 may have any suitable shape and size. As an example, the housing 11 may be of a portable size. Further, the main body apparatus 2 alone or the unified apparatus obtained by attaching the left and right controllers 3 and 4 to the main body apparatus 2 may function as a mobile apparatus. The main body apparatus 2 or the unified apparatus may also function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be any type of display device.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed in the main surface of the housing 11. Then, output sounds of the speakers 88 are output through the speaker holes 11a and 11b.

Further, the main body apparatus 2 includes a left terminal 17 for allowing the main body apparatus 2 to perform wired communication with the left controller 3, and a right terminal 21 for allowing the main body apparatus 2 to perform wired communication with the right controller 4.

As shown in FIG. 3, the main body apparatus 2 includes a slot 23. The slot 23 is provided in an upper side surface of the housing 11. The slot 23 is so shaped as to allow a predetermined type of storage medium to be loaded in the slot 23. The predetermined type of storage medium is, for example, a dedicated storage medium (e.g., a dedicated memory card) to the game system 1 and an information processing apparatus of the same type as that of the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is for allowing the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle also functions as a hub device (specifically, a USB hub).

Figure 4:
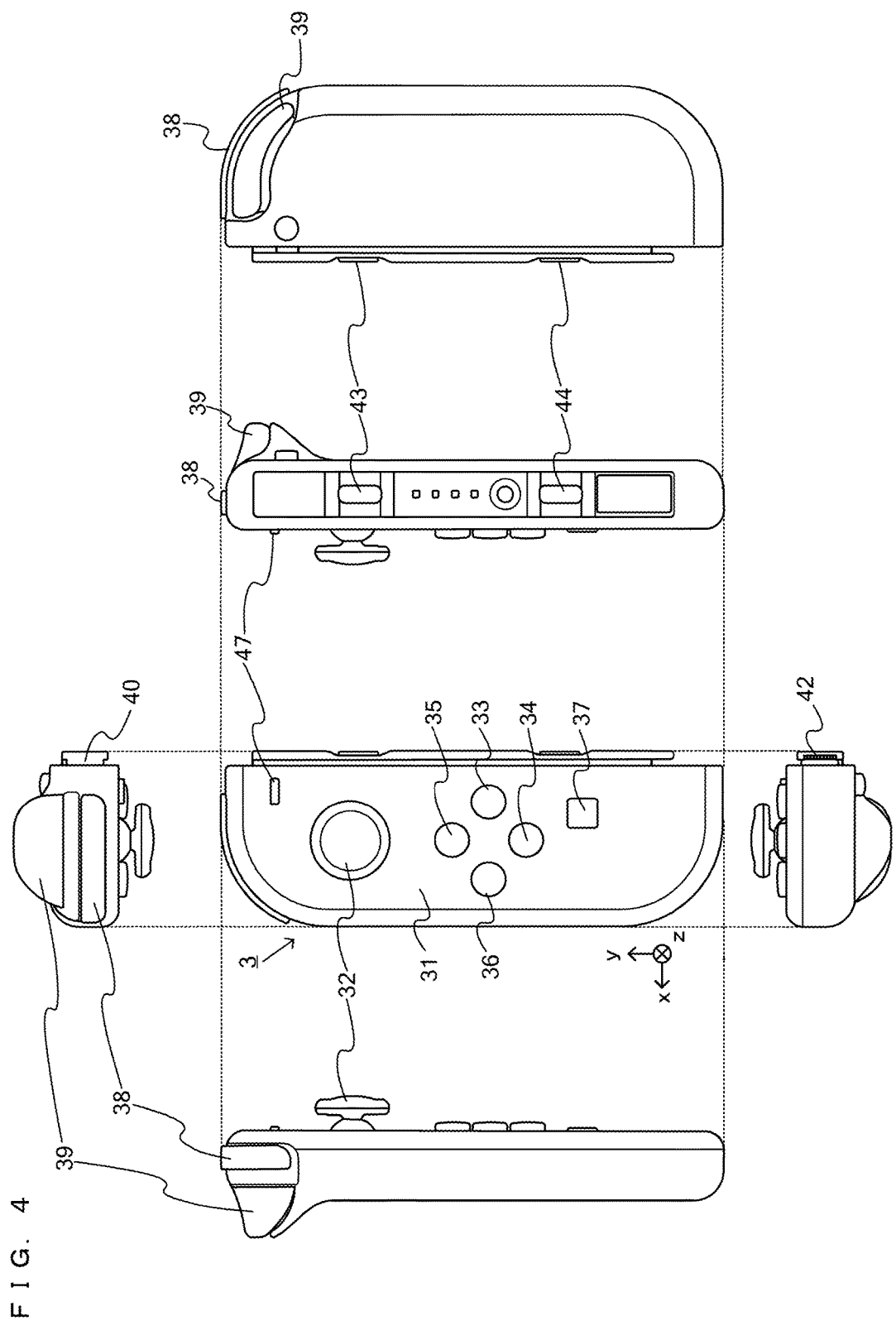
FIG. 4 is an example non-limiting diagram having six orthogonal views showing an example of a left controller 3.

FIG. 4 is a diagram having six orthogonal views showing an example of the left controller 3. As shown in FIG. 4, the left controller 3 includes a housing 31. In the exemplary embodiment, the housing 31 is longer than it is wide, i.e., is shaped to be long in the vertical direction (i.e., the y-axis direction shown in FIGS. 1 and 4). In the state in which the left controller 3 is detached from the main body apparatus 2, the left controller 3 can also be held in the portrait orientation. The housing 31 has such a shape and size that when held in the portrait orientation, the housing 31 can be held by one hand, particularly the left hand. Further, the left controller 3 can also be held in the landscape orientation. When held in the landscape orientation, the left controller 3 may be held by both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing down the analog stick 32.

The left controller 3 includes various operation buttons. The left controller 3 includes four operation buttons 33 to 36 (specifically, a "right" button 33, a "down" button 34, an "up" button 35, and a "left" button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for allowing the left controller 3 to perform wired communication with the main body apparatus 2.

Figure 5:
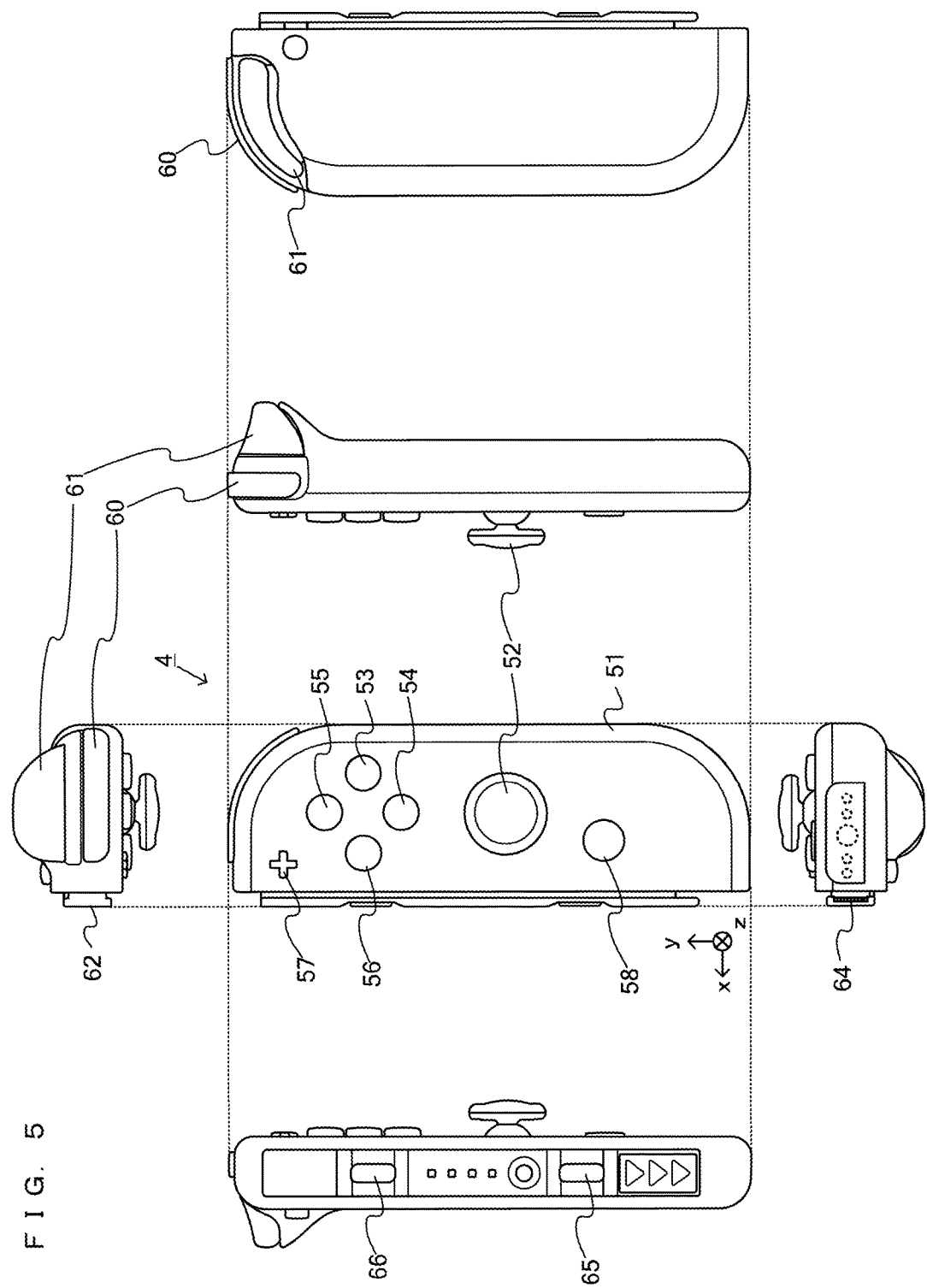
FIG. 5 is an example non-limiting diagram having six orthogonal views showing an example of a right controller 4.

FIG. 5 is a diagram having six orthogonal views showing an example of the right controller 4. As shown in FIG. 5, the right controller 4 includes a housing 51. In the exemplary embodiment, the housing 51 is longer than it is wide, i.e., is shaped to be long in the vertical direction. In the state in which the right controller 4 is detached from the main body apparatus 2, the right controller 4 can also be held in the portrait orientation. The housing 51 has such a shape and size that when held in the portrait orientation, the housing 51 can be held by one hand, particularly the right hand. Further, the right controller 4 can also be held in the landscape orientation. When held in the landscape orientation, the right controller 4 may be held by both hands.

As with the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, as with the left controller 3, the right controller 4 includes four operation buttons 53 to 56 (specifically, an A-button 53, a B-button 54, an X-button 55, and a Y-button 56). Further, the right controller 4 includes a "+" (plus) button 57 and a home button 58. Further, the right controller 4 includes a first R-button 60 and a ZR-button 61 in an upper right portion of a side surface of the housing 51. Further, as with the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
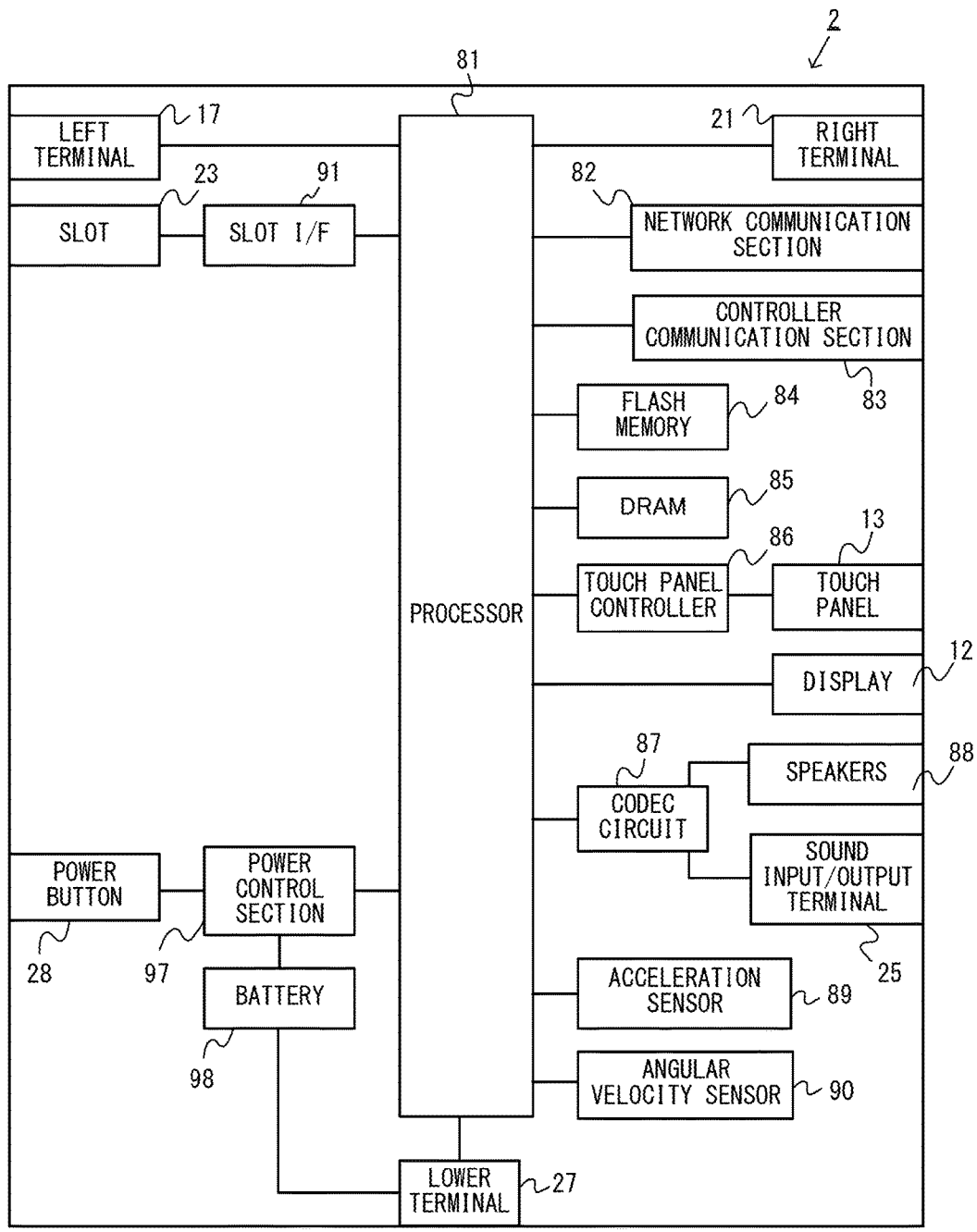
FIG. 6 is an example non-limiting block diagram showing an example of an internal configuration of a main body apparatus 2.

FIG. 6 is a block diagram showing an example of an internal configuration of the main body apparatus 2. The main body apparatus 2 includes components 81 to 91, 97, and 98 shown in FIG. 6 in addition to the components shown in FIG. 3. Some of the components 81 to 98 may be implemented as electronic parts on an electronic circuit board, which is accommodated in the housing 11.

The main body apparatus 2 includes a processor 81. The processor 81 is an information processing section for executing various types of information processing to be executed by the main body apparatus 2. For example, the CPU 81 may be composed only of a central processing unit (CPU), or may be a system-on-a-chip (SoC) having a plurality of functions such as a CPU function, a graphics processing unit (GPU) function, and the like. The processor 81 executes an information processing program (e.g., a game program) stored in a storage section (specifically, an internal storage medium such as a flash memory 84, an external storage medium that is loaded in the slot 23, or the like), thereby performing the various types of information processing.

The main body apparatus 2 includes a flash memory 84 and a dynamic random access memory (DRAM) 85 as examples of internal storage media built in the main body apparatus 2. The flash memory 84 and the DRAM 85 are coupled to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is coupled to the processor 81. The slot I/F 91 is coupled to the slot 23, and reads and writes data from and to the predetermined type of storage medium (e.g., a dedicated memory card) loaded in the slot 23, in accordance with instructions from the processor 81.

The processor 81 appropriately reads and writes data from and to the flash memory 84, the DRAM 85, and each of the above storage media, thereby performing the above information processing.

The main body apparatus 2 includes a network communication section 82. The network communication section 82 is coupled to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is coupled to the processor 81. The controller communication section 83 wirelessly communicates with the left controller 3 and/or the right controller 4. The main body apparatus 2 may communicate with the left and right controllers 3 and 4 using any suitable communication method. In the exemplary embodiment, the controller communication section 83 performs communication with the left and right controllers 3 and 4 in accordance with the Bluetooth (registered trademark) standard.

The processor 81 is coupled to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of the left and right controllers 3 and 4. As an example, a first user can provide an input to the main body apparatus 2 using a first set of the left and right controllers 3 and 4, and at the same time, a second user can provide an input to the main body apparatus 2 using a second set of the left and right controllers 3 and 4.

The main body apparatus 2 includes a touch panel controller 86 that is a circuit for controlling the touch panel 13. The touch panel controller 86 is coupled between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is coupled to the processor 81. The processor 81 displays, on the display 12, a generated image (e.g., an image generated by executing the above information processing) and/or an externally acquired image.

The main body apparatus 2 includes a codec circuit 87 and speakers (specifically, a left speaker and a right speaker) 88. The codec circuit 87 is coupled to the speakers 88 and an audio input/output terminal 25 and also coupled to the processor 81. The codec circuit 87 is for controlling the input and output of audio data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the x-, y-, and z-axes shown in FIG. 2). It should be noted that the angular velocity sensor 90 may detect an angular velocity about one axis or angular velocities about two axes.

The acceleration sensor 89 and the angular velocity sensor 90 are coupled to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding a motion and/or orientation of the main body apparatus 2.

The main body apparatus 2 includes a power control section 97 and a battery 98. The power control section 97 is coupled to the battery 98 and the processor 81. Further, although not shown, the power control section 97 is coupled to components of the main body apparatus 2 (specifically, components that receive power supplied from the battery 98, the left terminal 17, and the right terminal 21). Based on a command from the processor 81, the power control section 97 controls the supply of power from the battery 98 to each of the above components.

Further, the battery 98 is coupled to the lower terminal 27. When an external charging device (e.g., the cradle) is connected to the lower terminal 27, and power is supplied to the main body apparatus 2 via the lower terminal 27, the battery 98 is charged with the supplied power.

FIG. 7 is a block diagram showing examples of internal configurations of the main body apparatus 2, the left controller 3, and the right controller 4. It should be noted that the details of the internal configuration of the main body apparatus 2 are shown in FIG. 6 and therefore are not shown in FIG. 7.

The left controller 3 includes a communication control section 101 that communicates with the main body apparatus 2. As shown in FIG. 7, the communication control section 101 is coupled to components including the terminal 42. In the exemplary embodiment, the communication control section 101 can communicate with the main body apparatus 2 through both wired communication via the terminal 42 and wireless communication without via the terminal 42. The communication control section 101 controls a communication method which is performed by the left controller 3 with respect to the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. The buttons 103 and the analog stick 32 each output information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x-, y-, and z-axes shown in FIG. 5) directions. It should be noted that the acceleration sensor 104 may detect an acceleration along one axial direction or accelerations along two axial directions. Each of the acceleration sensor 104 and the angular velocity sensor 105 is coupled to the communication control section 101. Then, the detection results of the acceleration sensor 104 and the angular velocity sensor 105 are output to the communication control section 101 repeatedly at appropriate timings.

The communication control section 101 acquires information regarding an input (specifically, information regarding an operation or the detection result of a sensor) from each of input sections (specifically, the buttons 103, the analog stick 32, and the sensors 104 and 105). The communication control section 101 transmits operation data including the acquired information (or information acquired by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can acquire inputs provided to the left controller 3. That is, the main body apparatus 2 can determine operations performed on the buttons 103 and the analog stick 32 based on the operation data. Further, the main body apparatus 2 can calculate information regarding a motion and/or orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled in accordance with a command from the main body apparatus 2. That is, the communication control section 101, when receiving the above command from the main body apparatus 2, drives the vibrator 107 in accordance with the received command. Here, the left controller 3 includes a codec section 106. The communication control section 101, when receiving the above command, outputs a control signal corresponding to the command to the codec section 106. The codec section 106 generates a drive signal for driving the vibrator 107 from the control signal received from the communication control section 101, and outputs the drive signal to the vibrator 107. The vibrator 107 is operated according to the drive signal.

More specifically, the vibrator 107 is a linear vibration motor. Unlike a typical motor that provides a rotary motion, the linear vibration motor is driven in a predetermined direction according to an input voltage and therefore can be vibrated at an amplitude and frequency corresponding to the waveform of the input voltage. In the exemplary embodiment, a vibration control signal transmitted from the main body apparatus 2 to the left controller 3 may be a digital signal representing a frequency and an amplitude every unit of time. In another exemplary embodiment, the main body apparatus 2 may transmit information indicating the waveform itself. However, if only the amplitude and the frequency are transmitted, the amount of communication data can be reduced. In order to further reduce the amount of data, only the differences between the current values of the amplitude and the frequency at each time and the previous values may be transmitted, instead of the current values themselves. In this case, the codec section 106 converts the digital signal indicating the values of the amplitude and the frequency acquired from the communication control section 101 into an analog voltage waveform, and inputs a voltage to the vibrator 107 according to the resulting waveform, thereby driving the vibrator 107. Thus, the main body apparatus 2 changes the amplitude and frequency to be transmitted every unit of time, and thereby can control the amplitude and frequency with which the vibrator 107 is vibrated at each time. It should be noted that two or more different sets of amplitudes and frequencies indicating two or more waveforms may be transmitted from the main body apparatus 2 to the left controller 3, instead of a single set of amplitudes and frequencies indicating a single waveform. In this case, the codec section 106 combines waveforms indicated by the plurality of sets of amplitudes and frequencies thus received, and thereby can generate a single voltage waveform for controlling the vibrator 107.

The left controller 3 includes a power supply section 108. In the exemplary embodiment, the power supply section 108 includes a battery and a power control circuit. Although not shown, the power control circuit is coupled to the battery and also coupled to components of the left controller 3 (specifically, components that receive power supplied from the battery).

As shown in FIG. 7, the right controller 4 includes a communication control section 111 that communicates with the main body apparatus 2. Further, the right controller 4 includes a memory 112 that is coupled to the communication control section 111. The communication control section 111 is coupled to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication without via the terminal 64 (specifically, communication compliant with the Bluetooth (registered trademark) standard). The communication control section 111 controls a communication method that is performed by the right controller 4 with respect to the main body apparatus 2.

The right controller 4 includes input sections similar to those of the left controller 3. Specifically, the right controller 4 includes buttons 113, an analog stick 52, and inertial sensors (an acceleration sensor 114 and an angular velocity sensor 115). These input sections have functions similar to those of the input sections of the left controller 3 and operate in manners similar to those of the input sections of the left controller 3.

Further, the right controller 4 includes a vibrator 117 and a codec section 116. The vibrator 117 and the codec section 116 operate in manners similar to those of the vibrator 107 and the codec section 106, respectively, of the left controller 3. That is, the communication control section 111 operates the vibrator 117 using the codec section 116 in accordance with a command from the main body apparatus 2.

The right controller 4 includes a processing section 121. The processing section 121 is coupled to the communication control section 111.

The right controller 4 includes a power supply section 118. The power supply section 118 has a function similar to that of the power supply section 108 of the left controller 3, and operates in a similar manner.

Next, a game played in the game system 1 will be described. In the exemplary embodiment, a player plays a game with its left and right hands holding the left and right controllers 3 and 4, respectively. In the exemplary embodiment, the vibrators 107 and 117 of the left and right controllers 3 and 4 are caused to vibrate according to a motion state of a character operated by the player. It should be noted that a game may be played with the left and right controllers 3 and 4 being detached from the main body apparatus 2. Alternatively, as shown in FIG. 1, a game may be played with the left and right controllers 3 and 4 being attached to the main body apparatus 2.

Figure 8:
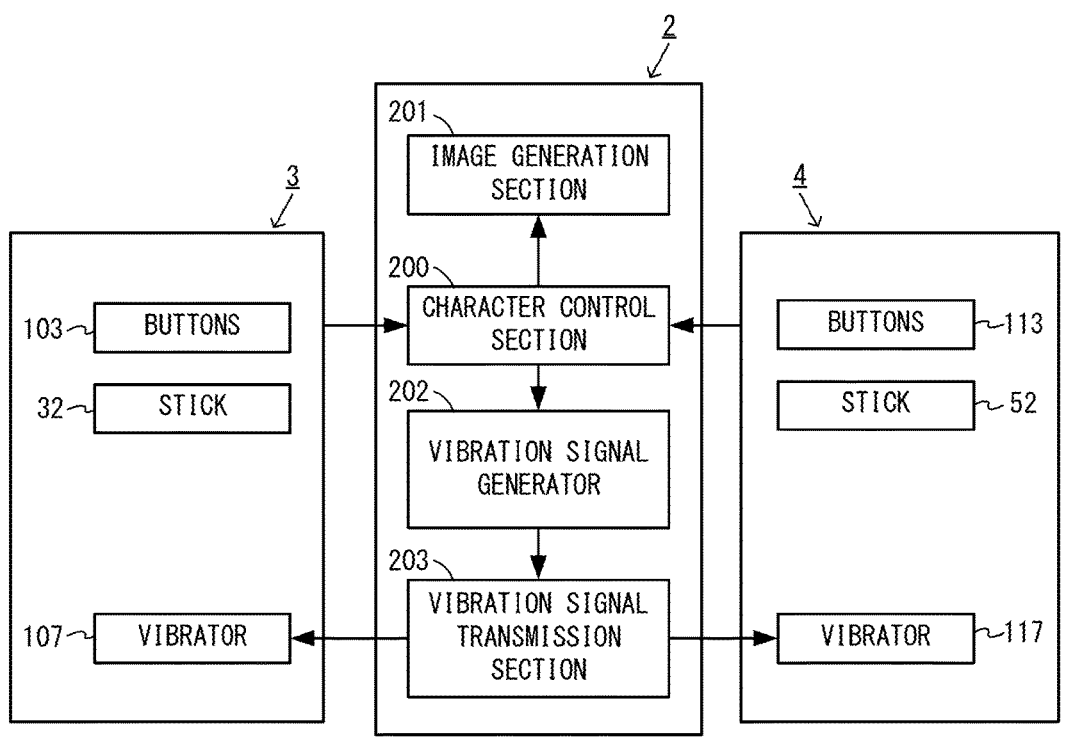
FIG. 8 is an example non-limiting diagram showing an example of a functional configuration of a game system 1 according to the present exemplary embodiment.

FIG. 8 is a diagram showing an example of a functional configuration of the game system 1 according to the exemplary embodiment. As shown in FIG. 8, the main body apparatus 2 includes a character control section 200, an image generation section 201, a vibration signal generator 202, and a vibration signal transmission section 203. The processor 81 of the main body apparatus 2 executes a predetermined game program to function as the character control section 200, the image generation section 201, the vibration signal generator 202, and the vibration signal transmission section 203. The predetermined game program may, for example, be stored in an external storage medium that is loaded in the slot 23, or in the flash memory 84, or may be externally acquired via a network.

The character control section 200 acquires operation data corresponding to the player's operation performed on each of the buttons 103 and 113 and the analog sticks (hereinafter simply referred to as "sticks") 32 and 52 of the left and right controllers 3 and 4. Based on the acquired operation data, the character control section 200 controls an operation object (a player character or an animal character). For example, the character control section 200 moves a player character in a virtual space, based on operation data corresponding to an operation performed on the stick 32 of the left controller 3. For example, when a player character is riding on an animal character described below, the character control section 200 moves the animal character in the virtual space, based on operation data corresponding to an operation performed on the stick 32. Further, the character control section 200 causes the player character to jump in the virtual space, based on operation data corresponding to an operation performed on any (e.g., the A-button 53) of the buttons 113 of the right controller 4, for example.

The image generation section 201 generates an image of the virtual space that contains an operation object operated by the player, using a virtual camera provided in the virtual space. The image generation section 201 generates an image of the virtual space at predetermined time intervals (e.g., intervals of 1/60 sec). The images generated by the image generation section 201 are output to the display 12, which displays the images. Because the image generation section 201 generates an image at predetermined time intervals, the display 12 displays an animation in which a player character performs motions, such as moving and jumping. It should be noted that images generated by the image generation section 201 may be displayed on an external display device (e.g., a television set) that is different from the display 12.

The vibration signal generator 202 generates a first vibration control signal and a second vibration control signal that correspond to a motion of an operation object that is controlled by the character control section 200. The generated first and second vibration control signals are transmitted to the left and right controllers 3 and 4, respectively, by the vibration signal transmission section 203. The vibrators 107 and 117 of the left and right controllers 3 and 4 vibrate with strengths based on the vibration control signals.

Specifically, the vibration signal generator 202 generates a first vibration control signal and a second vibration control signal that contain a frequency and amplitude of a vibration, based on previously stored vibration pattern data. The vibrator 107 vibrates with a frequency and amplitude corresponding to the first vibration control signal. The vibrator 117 vibrates with a frequency and amplitude corresponding to the second vibration control signal. The first and second vibration control signals are generated and transmitted to the vibrators 107 and 117, respectively, at predetermined time intervals (e.g., at intervals of 5 msec). As a result, the vibrators 107 and 117 each vibrate with a waveform corresponding to the vibration pattern data. It should be noted that the vibration signal generator 202 can adjust the strength (amplitude) of a vibration according to the vibration pattern data. The adjustment of the vibration strength is described below.

In the game of the exemplary embodiment, game scenes according to a first example to a fourth example described below are executed. Each example will now be described.

First Example

Figure 9:
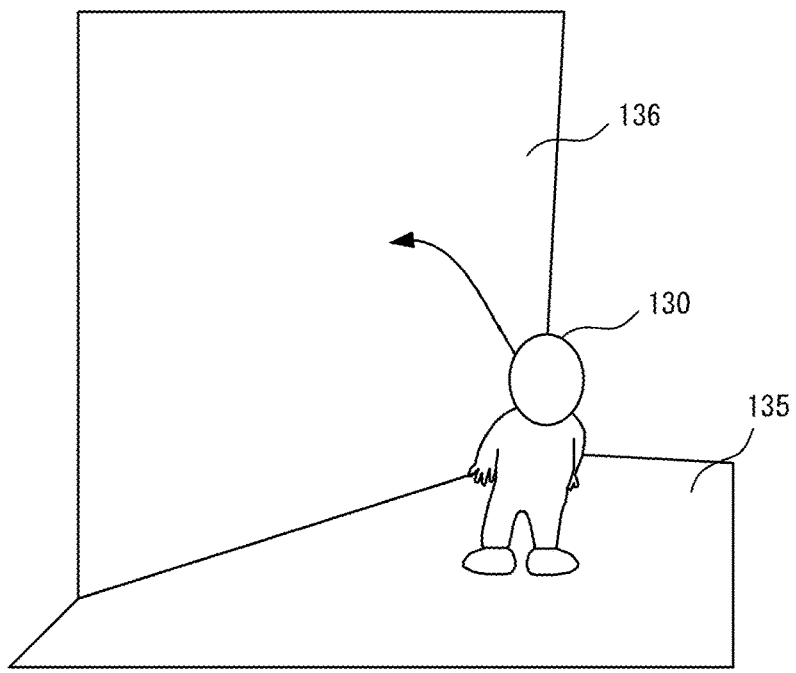
FIG. 9 is an example non-limiting diagram showing an example of a game scene according to a first example.
Figure 10:
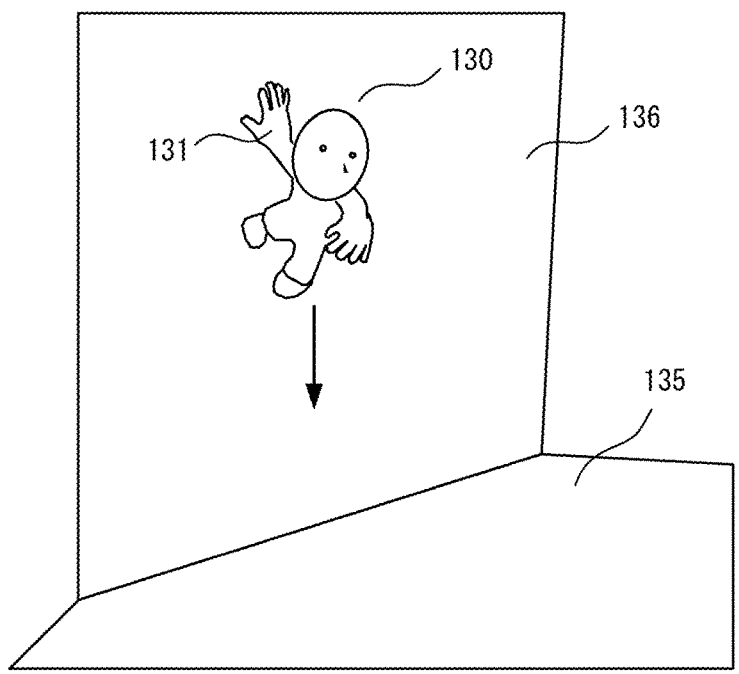
FIG. 10 is an example non-limiting diagram showing an example of an image that is displayed when a player character 130 jumps toward a wall object 136.

FIG. 9 is a diagram showing an example of a game scene according to the first example. FIG. 10 is a diagram showing an example of an image that is displayed when a player character 130 jumps toward a wall object 136.

As shown in FIG. 9, in the virtual space, a player character 130, a ground object 135, and a wall object 136 are provided. Further, in the virtual space, a virtual camera (not shown) is provided. The virtual camera is located within a predetermined range from the player character 130. Based on the virtual camera, an image of the virtual space that contains the player character 130 is generated, and the generated image is displayed on the display 12 or an external display device. It should be noted that, in the virtual space, other various objects (an enemy or opponent object, etc.) may be provided in addition to the above objects.

The player character 130 is an operation object that is operated by a player (user). The player causes the player character 130 to perform a motion, using the left and right controllers 3 and 4. The ground object 135 forms a ground in the virtual space. The wall object 136 is in a generally upright position relative to the ground object 135, extending from the ground object 135 in a height direction of the virtual space.

The player character 130 moves and jumps on the ground object 135 according to the player's operation. As shown in FIG. 9, when the player character 130 jumps from near the wall object 136 toward the wall object 136, an image as shown in FIG. 10 is displayed. Specifically, a situation is displayed in which the player character 130 drops downward in the virtual space with its one hand touching the wall object 136. At this time, the player character 130 drops downward, facing the virtual camera, with its right or left hand being on the wall object 136 (with its right or left hand sliding).

For example, as shown in FIG. 10, when the virtual camera is positioned so as to view the player character 130 from a left rear of the player character 130, the player character 130 faces the virtual camera, and drops downward with its right hand 131 being on the wall object 136. In this case, the right hand 131 of the player character 130 is on the left side as viewed from the player. While the player character 130 is dropping downward with the right hand 131 being on the wall object 136, the vibrators 107 and 117 of the left and right controllers 3 and 4 vibrate.

Specifically, the first and second vibration control signals are generated such that while the player character 130 is dropping downward with the right hand 131 being on the wall object 136 (with the hand on the left side of the player character 130 as viewed from the player being on the wall object 136), the left controller 3 vibrates more strongly than the right controller 4. The generated first and second vibration control signals are transmitted to the left and right controllers 3 and 4, respectively, which in turn cause the vibrators 107 and 117 of the left and right controllers 3 and 4 to vibrate.

Figure 11:
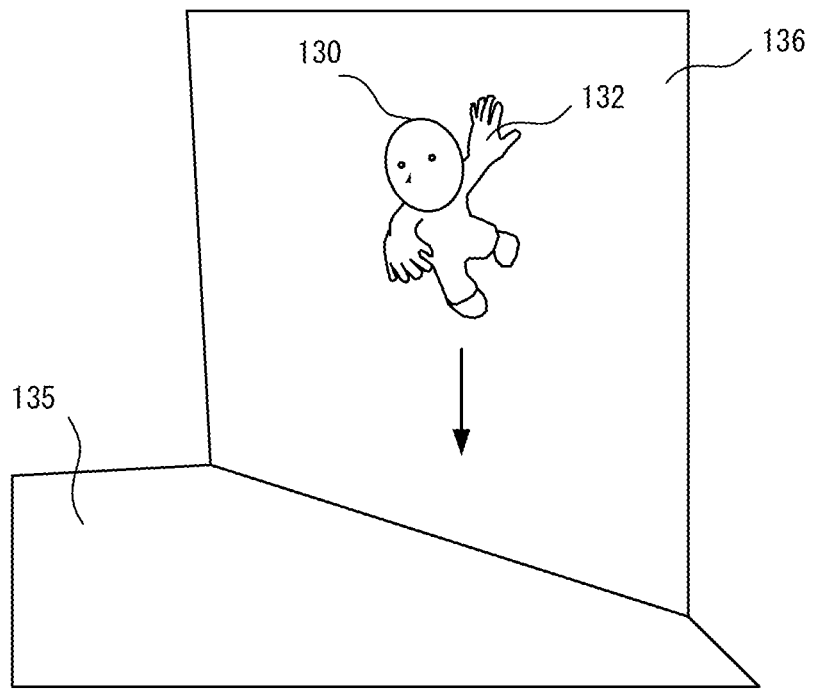
FIG. 11 is an example non-limiting diagram showing an example of an image that is displayed when a player character 130 jumps toward a wall object 136 in a case where a virtual camera is located at a right rear of the player character 130.

FIG. 11 is a diagram showing an example of an image that is displayed when the player character 130 jumps toward the wall object 136 in a case where the virtual camera is located at a right rear of the player character 130. As shown in FIG. 11, when the virtual camera is positioned so as to view the player character 130 from a right rear of the player character 130, the player character 130 faces the virtual camera, and drops downward with its left hand 132 being on the wall object 136. In this case, the left hand 132 of the player character 130 is on the right side as viewed from the player. The first and second vibration control signals are generated such that while the player character 130 is dropping downward with the left hand 132 being on the wall object 136, the right controller 4 vibrates more strongly than the left controller 3.

Thus, in the exemplary embodiment, when the player character 130 drops with a hand (e.g., the right hand 131) of the player character 130 being on the wall object 136, a controller (the left controller 3) corresponding to the hand (e.g., a hand on the left side) of the player character 130, which is on the left or right side as viewed from the player, vibrates more strongly than the other controller (the right controller 4), which is on the opposite side.

It should be noted that when the images of FIGS. 10 and 11 are displayed, the vibration strengths of the left and right controllers may be reversed, compared to the above embodiment. That is, when the right hand 131 of the player character 130 is on the wall object 136, the right controller 4 may be caused to vibrate more strongly than the left controller 3. Further, when left hand 132 of the player character 130 is on the wall object 136, the left controller 3 may be caused to vibrate more strongly than the right controller 4.

FIG. 12 is a diagram showing an example of timings of the animation displayed on the screen and the vibration control signals output to the left and right controllers 3 and 4. When the player's operation causes the player character 130 to jump toward the wall object 136, an animation A1 (hereinafter denoted by "animation A1 (right)") in which the player character 130 drops downward with its left hand (hand on the right side as viewed from the player) being on the wall object 136, is displayed, for example.

As shown in FIG. 12, for example, at time Ts1, the display of the animation A1 (right) is started. When the animation A1 (right) is displayed, the first and second vibration control signals are output from the main body apparatus 2 to the left and right controllers 3 and 4, respectively. The first and second vibration control signals are output at predetermined time intervals (e.g., intervals of 5 msec) while the animation A1 (right) is being displayed. The display of the animation A1 (right) is ended at time Te1. When the display of the animation A1 (right) is ended, the output of the vibration control signals is also ended.

While the animation A1 (right) is being displayed, the vibrator 117 of the right controller 4 vibrates more strongly than the vibrator 107 of the left controller 3. For example, while the animation A1 (right) is being displayed, the vibrator 117 of the right controller 4 vibrates with a strength of "1," and the vibrator 107 of the left controller 3 vibrates with a strength of "0.4."

Specifically, vibration pattern data P1 indicating a vibration waveform corresponding to the animation A1 is stored, and vibration control signals based on the vibration pattern data P1 are output from the main body apparatus 2 to the controllers 3 and 4. As a result, the vibrators 107 and 117 of the controllers 3 and 4 vibrate with waveforms based on the vibration pattern data P1. The vibration strength based on vibration pattern data is adjusted between "0" and "1."

FIG. 13 is a diagram showing an example of waveforms of vibrations based on the vibration pattern data P1, i.e., vibration waveforms of the vibrators 107 and 117 that are occurring when the animation A1 (right) is being displayed.

As shown in FIG. 13, the frequency and amplitude of vibration at each time are controlled based on the vibration pattern data P1 so that the vibrator 117 vibrates. When the animation A1 (right) is displayed, the vibrator 117 of the right controller 4 vibrates with a waveform as shown in FIG. 13. In this case, it is assumed that the vibration strength of the vibrator 117 is "1." That is, it is assumed that the vibration strength (before adjustment) of a vibration waveform based on the vibration pattern data P1 is "1." In this case, although the vibrator 107 of the left controller 3 vibrates based on the same vibration pattern data P1 as that for the vibrator 117 of the right controller 4, the vibration strength of the vibrator 107 is smaller than that of the vibrator 117. For example, the vibrator 117 of the right controller 4 vibrates with a strength of "1," and the vibrator 107 of the left controller 3 vibrates with a strength of "0.4."

The vibration strength is adjusted by reducing the amplitude based on the vibration pattern data. Specifically, the vibration signal generator 202 reads, from the vibration pattern data, a frequency F and reference amplitude A of a vibration at that time. Thereafter, for example, when a vibrator is caused to vibrate with a strength of "1," the vibration signal generator 202 outputs a vibration control signal containing the read frequency F and reference amplitude A to the vibration signal transmission section 203.

Meanwhile, for example, when a vibrator is caused to vibrate with a strength of "0.4," the vibration signal generator 202 multiplies the reference amplitude A read from the vibration pattern data by "0.4" to calculate a reduced amplitude A'. Thereafter, the vibration signal generator 202 outputs a vibration control signal containing the read frequency F and the calculated amplitude A' to the vibration signal transmission section 203. The vibration signal transmission section 203 outputs, to the left and right controllers 3 and 4, the vibration control signals containing the frequencies and amplitudes output from the vibration signal generator 202.

It should be noted that the vibration strengths of the left and right vibrators 3 and 4 are not limited to the above embodiment, and may be modified as appropriate. For example, while the animation A1 (right) is being displayed, the vibrator 117 of the right controller 4 may be caused to vibrate with a strength of "1," and the vibrator 107 of the left controller 3 may not be caused to vibrate (the strength is "0"). Further, while the animation A1 (right) is being displayed, the vibrator 117 of the right controller 4 may be caused to vibrate with a strength of "1," and the vibrator 107 of the left controller 3 may be caused to vibrate with a strength of "0.1."

Further, the vibration strength may not be fixed, and may be adjusted within the range of "0" to "1" according to a situation in the game. For example, when the animation A1 (right) is displayed, the vibration strengths of the vibrator 117 of the right controller 4 and the vibrator 107 of the left controller 3 may be adjusted within the range of "0" to "1" according to the type of the wall object 136. In this case, the vibrator 117 of the right controller 4 is caused to vibrate more strongly than the vibrator 107 of the left controller 3.

Further, the same or different vibration pattern data may be used for the animation A1 (right) and the animation A1 (left). That is, when the animation A1 (right) is displayed, the vibrations of the vibrators 107 and 117 may be controlled based on first vibration pattern data P1, and when the animation A1 (left) is displayed, the vibrations of the vibrators 107 and 117 may be controlled based on second vibration pattern data P1 that is different from the first vibration pattern data P1.

Further, a plurality of types of wall objects 136 may be provided at different locations in the virtual space, and different pieces of vibration pattern data may be used for the different types (locations in the virtual space) of wall objects 136. Further, different pieces of vibration pattern data may be used for different regions (locations) of the same wall object 136 on which a hand of the player character 130 is put.

Referring back to FIG. 12, it is assumed that after the display of the animation A1 (right) is ended, the player character 130 jumps toward the wall object 136 again by the player's operation. In this case, an animation A1 (hereinafter denoted by "animation A1 (left)") in which the player character 130 drops downward with its right hand (hand on the left side as viewed from the player) being on the wall object 136.

While the animation A1 (left) is being displayed, the vibrator 107 of the left controller 3 vibrates more strongly than the vibrator 117 of the right controller 4. For example, while the animation A1 (left) is being displayed, the vibrator 117 of the right controller 4 vibrates with a strength of "0.4," and the vibrator 107 of the left controller 3 vibrates with a strength of "1." It should be noted that while the animation A1 (left) is being displayed, the vibrators 107 and 117 vibrate based on the same vibration pattern data P1 as that which is used when the animation A1 (right) is displayed.

Thus, the left and right controllers 3 and 4 are caused to vibrate according to an animation that is displayed, whereby the player can feel different vibrations corresponding to different states of the player character 130 (the state in which the left hand is on the wall object 136, and the state in which the right hand is on the wall object 136). As a result, the player can know a state of the player character 130 in the game, from vibrations transmitted to its left and right hands. In particular, the left and right controllers 3 and 4 vibrate with different strengths, and therefore, the player can recognize a left-or-right state of the player character 130 (which of the left and right hands is on the wall object 136). Further, the player is allowed to feel a vibration corresponding to a motion state of the player character 130, and therefore, the enjoyment of the game is improved, and at the same time, the sense of realism of the game can be enhanced.

Second Example

Figure 14:
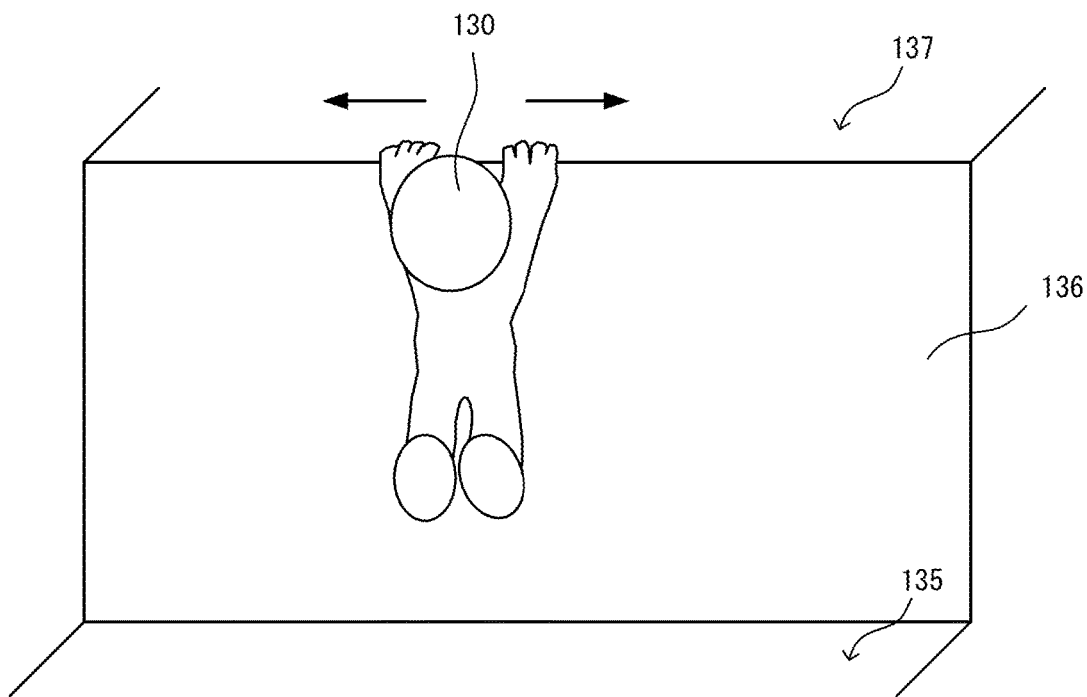
FIG. 14 is an example non-limiting diagram showing an example of a game scene according to a second example, indicating a state in which a player character 130 is hanging from a wall object 136.
Figure 15:
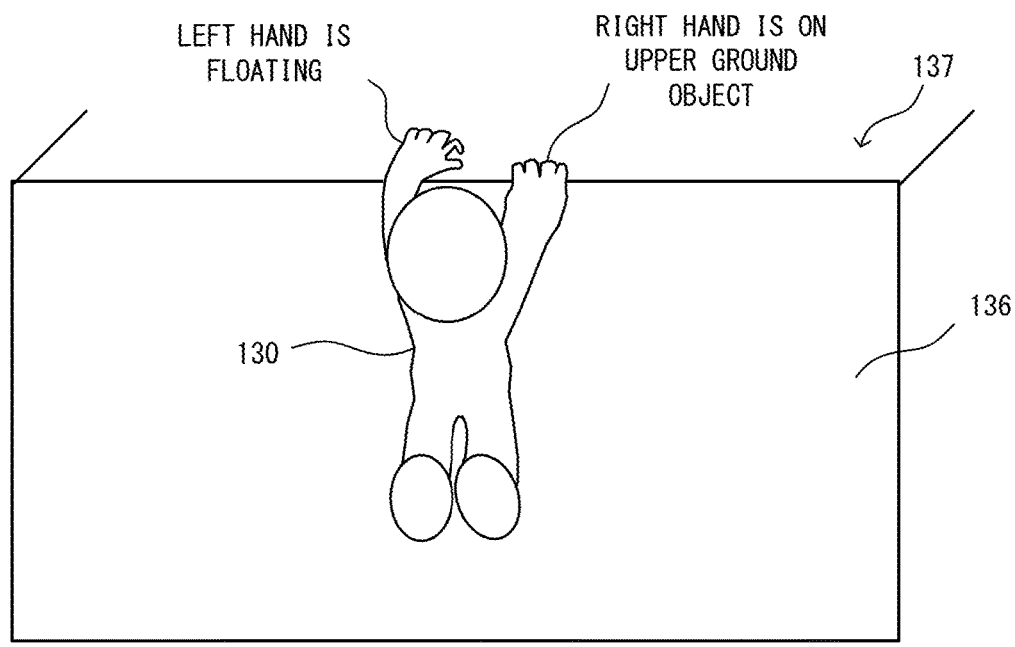
FIG. 15 is an example non-limiting diagram showing an example of a situation where a player character 130 moves to the right while hanging from a wall object 136 by taking hold of an upper end portion thereof.

Next, a game scene according to a second example will be described. FIG. 14 is a diagram showing an example of the game scene according to the second example, indicating a state in which the player character 130 is hanging from the wall object 136. FIG. 15 is a diagram showing an example of a situation where the player character 130 moves to the right while hanging from the wall object 136 by taking hold of an upper end portion thereof.

For example, when the player character 130 jumps on a lower ground object 135 to reach near a boundary between the wall object 136 and an upper ground object 137, the player character 130 takes hold of an upper end portion of the wall object 136 and hangs from the wall object 136 (FIG. 14). In this state, if the player has input "left" or "right" using the stick 32 of the left controller 3, the player character 130 moves in the direction input by the stick 32 while taking hold of the upper end portion of the wall object 136 (FIG. 15). At this time, the player character 130 moves to the right with its left and right hands being alternately put on the upper end portion of the wall object 136.

Specifically, as shown in FIG. 15, the right hand of the player character 130 is on the upper end portion of the wall object 136 at a certain moment, and the left hand of the player character 130 is floating at that moment. At the next moment, the left hand of the player character 130 is on the upper end portion of the wall object 136, and the right hand of the player character 130 is floating. Thus, the player character 130 moves to the right with its left and right hands being alternately put on the upper end portion of the wall object 136.

In the game of the exemplary embodiment, when "right" is input using the stick 32, an animation A2 (right) is displayed in which the player character 130 puts its right hand on the wall object 136 before putting its left hand on the wall object 136. When the player continues to input "right" using the stick 32, the animation A2 (right) is repeatedly displayed. As a result, a situation is displayed in which the player character 130 moves to the right. Further, when "left" is input using the stick 32, an animation A2 (left) is dispalyed in which the player character 130 put its left hand on the wall object 136 before putting its right hand on the wall object 136. When the player continues to input "left" using the stick 32, the animation A2 (left) is repeatedly displayed. As a result, a situation is displayed in which the player character 130 moves to the left.

Figure 16:
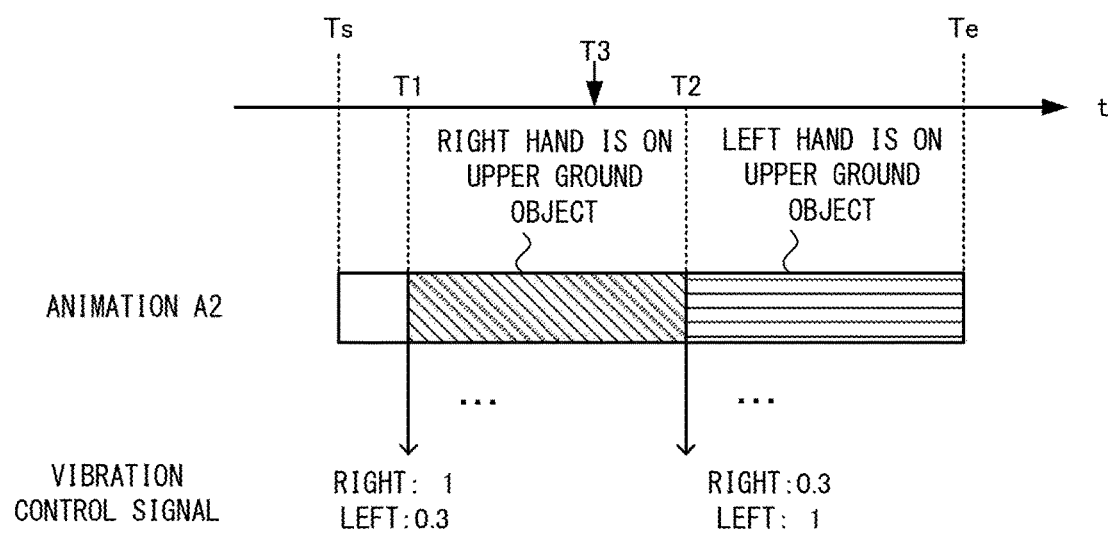
FIG. 16 is an example non-limiting diagram showing an example of timings of an animation A2 (right) and vibration control signals output to left and right controllers 3 and 4.

FIG. 16 is a diagram showing an example of timings of the animation A2 (right) and the vibration control signals output to the left and right controllers 3 and 4. When the player character 130 moves to the right while taking hold of the upper end portion of the wall object 136, the animation A2 (right) is displayed. In FIG. 16, the animation A2 (right) in which the player character 130 puts its right hand before putting its left hand during a period of time from time Ts to time Te, is displayed.

As shown in FIG. 16, at time Ts when the display of the animation A2 is started, the right hand of the player character 130 is initially floating. At time T1, the right hand of the player character 130 is put on the upper end portion of the wall object 136. When the right hand is put on the upper end portion of the wall object 136, the vibration control signals are output from the main body apparatus 2 to the left and right controllers 3 and 4, so that the vibrators 107 and 117 of the left and right controllers 3 and 4 vibrate. During a period of time from time T1 to time T2, the right hand of the player character 130 is on the upper end portion of the wall object 136. During this period of time, the vibration control signals are repeatedly output from the main body apparatus 2 to the left and right controllers 3 and 4 at intervals of, for example, 5 msec.

Specifically, vibration pattern data P2 that is used when the animation A2 is displayed is previously stored. When the animation A2 is displayed, at time T1 the first and second vibration control signals that are based on the vibration pattern data P2 are output from the main body apparatus 2 to the left and right controllers 3 and 4, respectively. As a result, the vibrators 107 and 117 of the left and right controllers 3 and 4 vibrate. At this time, the vibration strengths are adjusted such that the vibrator 117 of the right controller 4 vibrates more strongly than the vibrator 107 of the left controller 3. For example, the vibrator 117 of the right controller 4 vibrates with a strength of "1," and the vibrator 107 of the left controller 3 vibrates with a strength of "0.3." The vibration strengths are adjusted in the same manner as described in the first example.

Next, at time T2, the left hand of the player character 130 is put on the upper end portion of the wall object 136. Prior to time T2, the left hand of the player character 130 is put into a floating state. At time T2, the left hand of the player character 130 is put on the upper end portion of the wall object 136. When the left hand is put on the upper end portion of the wall object 136, the first and second vibration control signals are output from the main body apparatus 2 to the left and right controllers 3 and 4, respectively. During a period of time from time T2 to time Te, the left hand of the player character 130 is on the upper end portion of the wall object 136. During this period of time, the vibration control signals are repeatedly output from the main body apparatus 2 to the left and right controllers 3 and 4 at intervals of, for example, 5 msec. At this time, the vibration strengths are adjusted such that the vibrator 107 of the left controller 3 vibrates more strongly than the vibrator 117 of the right controller 4. For example, the vibrator 117 of the right controller 4 vibrates with a strength of "0.3," and the vibrator 107 of the left controller 3 vibrates with a strength of "1."

When the player continues to input "right" using the stick 32, the animation A2 is repeatedly displayed, i.e., a state in which the right hand is on the wall object 136 and a state in which the left hand is on the wall object 136 are alternately displayed. When the animation A2 is displayed, the vibration control signals are repeatedly output as described above. As a result, the left and right controllers 3 and 4 alternately vibrate more strongly than the other in synchronization with the motions of the left and right hands of the player character 130 being alternately put on the upper end portion of the wall object 136.

It should be noted that the example shown in FIG. 16 is merely illustrative, and alternatively, the timing when the state of a hand of the player character 130 is changed, the timing when a vibration is ended, the vibration strengths, etc., may be changed as appropriate. For example, an additional state (e.g., a state in which both hands are on the wall object 136) may be provided between the state in which the right hand of the player character 130 is on the wall object 136 (from time T1 to time T2) and the state in which the left hand of the player character 130 is on the wall object 136 (from time T2 to time Te).

Further, in the foregoing, in the state in which the right hand of the player character 130 is on the wall object 136, the vibration control signal for causing the right controller 4 to vibrate strongly (the first vibration control signal for causing the left controller 3 to vibrate with a strength of "0.3" and the second vibration control signal causing the right controller 4 to vibrate with a strength of "1") is repeatedly output. The output of the vibration control signal for causing the right controller 4 to vibrate strongly may be performed only during a period of time from time T1 when the right hand of the player character 130 is put on the wall object 136 to time T3 (<T2). In this case, the vibration control signals are not output from time T3 to time T2, so that the vibrations of the left and right controllers 3 and 4 are stopped. Thereafter, at time T2, the left hand of the player character 130 is put on the wall object 136, and the output of the vibration control signal for causing the left controller 3 to vibrate strongly (the first vibration control signal for causing the left controller 3 to vibrate with a strength "1" and the second vibration control signal for causing the right controller 4 to vibrate with a strength of "0.3") is started. Further, when the right controller 4 is vibrating strongly, the left controller 3 may start vibrating strongly (i.e., the strong vibration of the right controller 4 may continue until time T2, and the strong vibration of the left controller 3 may start before time T2).

Further, for example, when the left hand of the player character 130 is put on the upper end portion of the wall object 136, the vibrator 107 of the left controller 3 may vibrate with a strength of "1," and the vibrator 117 of the right controller 4 may not vibrate. Further, when the left hand of the player character 130 is put on the upper end portion of the wall object 136, the vibrator 107 of the left controller 3 may vibrate with a strength of "1," and the vibrator 117 of the right controller 4 may vibrate with a strength of "0.1."

Thus, the left and right controllers 3 and 4 are caused to vibrate in synchronization with the timings when the left and right hands of the player character 130 are alternately put on the wall object 136, whereby the player can recognize a motion state of the player character 130 from the vibrations. Further, the left and right controllers 3 and 4 are caused to vibrate with different strengths, whereby the player can recognize, particularly, the left-or-right state of the player character 130. Further, the player is allowed to feel as if the player itself were the player character 130 and performed the same motions as those of the player character 130 in the virtual space, resulting in an increase in sense of realism of the game.

Third Example

Figure 17:
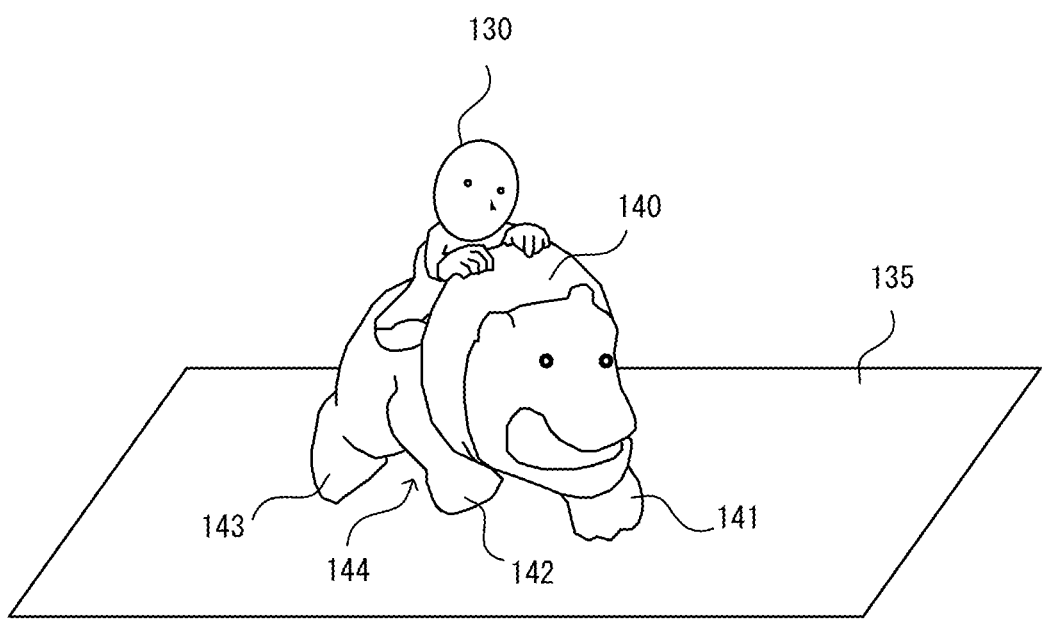
FIG. 17 is an example non-limiting diagram showing an example of a game scene according to a third example, indicating a scene in which a player character 130 moves, riding on an animal object 140.

Next, a game scene according to a third example will be described. FIG. 17 is a diagram showing an example of the game scene according to the third example, indicating a scene in which the player character 130 moves, riding on the animal object 140.

In a game of the exemplary embodiment, when the player character 130 rides on the animal object 140 provided in the virtual space, the animal object 140 on which the player character 130 rides moves in the virtual space. The animal object 140 is an operation object that is controlled according to the player's operation.

The animal object 140 has a left front paw 141, a right front paw 142, a right rear paw 143, and a left rear paw 144. While the player character 130 is riding on the animal object 140, an animation (hereinafter denoted by "animation A3") is displayed in which the animal object 140 is running on the ground object 135 in the virtual space. When the player operates, for example, the stick 32 of the left controller 3 while the player character 130 is riding on the animal object 140, the animal object 140 and the player character 130 move in a direction corresponding to that input using the stick 32.

When each of the paws of the animal object 140 is put on the ground object 135, the vibrators 107 and 117 of the left and right controllers 3 and 4 vibrate. For example, when the left front paw 141 of the animal object 140 is put on the ground object 135, the vibrators 107 and 117 vibrate such that the vibrator 107 of the left controller 3 vibrates more strongly than the vibrator 117 of the right controller 4. Further, when the right front paw 142 of the animal object 140 is put on the ground object 135, the vibrators 107 and 117 vibrate such that the vibrator 117 of the right controller 4 vibrates more strongly than the vibrator 107 of the left controller 3. Similarly, when the left rear paw 144 of the animal object 140 is put on the ground object 135, the vibrators 107 and 117 vibrate such that the vibrator 107 of the left controller 3 vibrates more strongly than the vibrator 117 of the right controller 4. Further, when the right rear paw 143 of the animal object 140 is put on the ground object 135, the vibrators 107 and 117 vibrate such that the vibrator 117 of the right controller 4 vibrates more strongly than the vibrator 107 of the left controller 3.

Figures 18, 19:
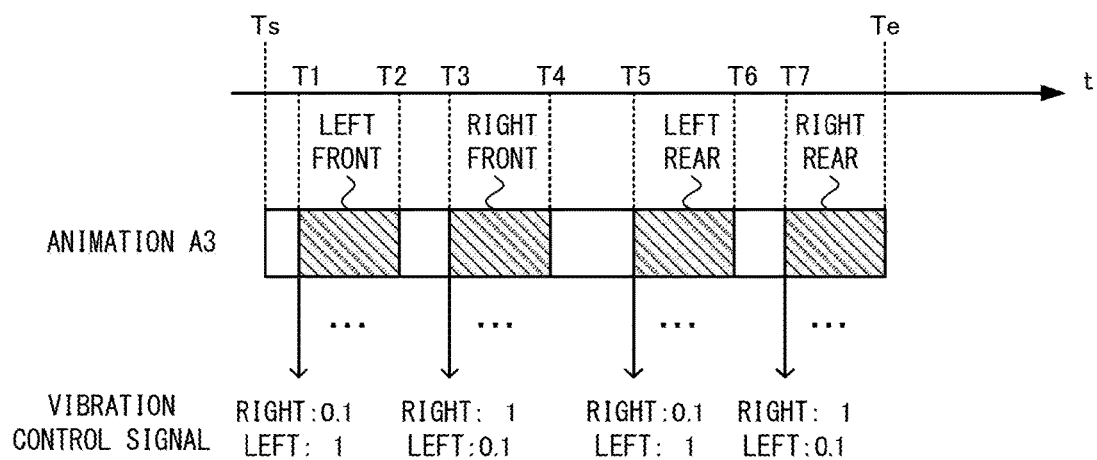
FIG. 18 is an example non-limiting diagram showing an example of timings of an animation A3 displayed on a screen and vibration control signals output to left and right controllers 3 and 4.
FIG. 19 is an example non-limiting diagram showing an example of a correspondence relationship between the types of ground objects 135 and vibration pattern data.

FIG. 18 is a diagram showing an example of timings of the animation A3 displayed on the screen and the vibration control signals output to the left and right controllers 3 and 4. FIG. 18 shows a case where, at time Ts, the player character 130 mounts the animal object 140, and the animal object 140 starts moving.

As shown in FIG. 18, when the display of the animation A3 is started at time Ts, the left front paw 141 of the animal object 140 is initially put into a floating state. At time T1, the left front paw 141 of the animal object 140 is put on the ground object 135. During a period of time from time T1 to time T2, the left front paw 141 is on the ground object 135. When the left front paw 141 is on the ground object 135, the first and second vibration control signals are output from the main body apparatus 2 to the left and right controllers 3 and 4, respectively, so that the vibrators 107 and 117 of the left and right controllers 3 and 4 vibrate. At this time, the vibrator 107 vibrate more strongly than the vibrator 117. For example, the vibrator 107 of the left controller 3 vibrates with a strength of "1," and the vibrator 117 of the right controller 4 vibrates with a strength of "0.1." At time T2, the output of the vibration control signals occurring due to the left front paw 141 being on the ground object 135 is ended.

Next, at time T3, the right front paw 142 of the animal object 140 is put on the ground object 135. For example, prior to time T3, the right front paw 142 of the animal object 140 is put into a floating state, and at time T3, the right front paw 142 of the animal object 140 is put on the ground object 135. During a period of time from time T3 to time T4, the right front paw 142 is on the ground object 135. During this period of time, the first and second vibration control signals are output from the main body apparatus 2 to the left and right controllers 3 and 4, respectively. At this time, the first and second vibration control signals are generated such that the vibrator 117 of the right controller 4 vibrates more strongly than the vibrator 107 of the left controller 3. For example, the vibrator 107 vibrates with a strength of "0.1," and the vibrator 117 vibrates with a strength of "1." At time T4, the output of the vibration control signals occurring due to the right front paw 142 being on the ground object 135 is ended.

Next, at time T5, the left rear paw 144 of the animal object 140 is put on the ground object 135. For example, prior to time T5, the left rear paw 144 of the animal object 140 is put into a floating state, and at time T5, the left rear paw 144 of the animal object 140 is put on the ground object 135. During a period of time from time T5 to time T6, the left rear paw 144 is on the ground object 135. During this period of time, the first and second vibration control signals are output from the main body apparatus 2 to the left and right controllers 3 and 4, respectively. At this time, the first and second vibration control signals are generated such that the vibrator 107 of the left controller 3 vibrates more strongly than the vibrator 117 of the right controller 4. For example, the vibrator 107 of the left controller 3 vibrates with a strength of "1," and the vibrator 117 of the right controller 4 vibrates with a strength of "0.1." At time T6, the output of the vibration control signals occurring due to the left rear paw 144 being on the ground object 135 is ended.

Next, at time T7, the right rear paw 143 of the animal object 140 is put on the ground object 135. For example, prior to time T7, the right rear paw 143 of the animal object 140 is put into a floating state, and at time T7, the right rear paw 143 of the animal object 140 is put on the ground object 135. During a period of time from time T7 to time Te, the right rear paw 143 is on the ground object 135. During this period of time, the first and second vibration control signals are output from the main body apparatus 2 to the left and right controllers 3 and 4, respectively. At this time, the first and second vibration control signals are generated such that the vibrator 117 of the right controller 4 vibrates more strongly than the vibrator 107 of the left controller 3. For example, the vibrator 107 of the left controller 3 vibrates with a strength of "0.1," and the vibrator 117 of the right controller 4 vibrates with a strength of "1." At time Te, the output of the vibration control signals occurring due to the right rear paw 143 being on the ground object 135 is ended.

It should be noted that the example of FIG. 18 is merely illustrative, and alternatively, the timing when each paw of the animal object 140 is put on the ground object 135, the timing when a vibration is ended, and the vibration strengths may be changed as appropriate. For example, two or more paws may be simultaneously put on the ground object 135, and a vibration occurring due to each paw being on the ground object 135 may occur. Further, for example, while the left and right controllers 3 and 4 are vibrating due to the left front paw 141 being on the ground object 135, another vibration may occur due to another paw being put on the ground object 135. That is, two or more vibrations each of which occurs due to one paw being put on the ground object 135 may occur simultaneously.

When a plurality of vibrations occur simultaneously, the plurality of vibrations may be combined. For example, when the left front paw 141 is put on the ground object 135, and at the same time as or immediately after that, the right front paw 142 is put on the ground object 135, a vibration that occurs due to the left front paw 141 being put on the ground object 135 and a vibration that occurs due to the right front paw 142 being put on the ground object 135 may be combined. Specifically, when the left front paw 141 is put on the ground object 135, the vibrator 107 of the left controller 3 vibrates with a strength of "1" (this vibration is denoted by "vibration VL1"). Meanwhile, when the right front paw 142 is put on the ground object 135, the vibrator 107 of the left controller 3 vibrates with a strength of "0.1" (this vibration is denoted by "vibration VL2"). In this case, the vibrator 107 of the left controller 3 may be caused to vibrate such that the vibration VL1 having a strength of "1" and the vibration VL2 having a strength of "0.1" are combined.

The vibrator 117 of the right controller 4 is caused to vibrate in a similar manner. That is, when the left front paw 141 is put on the ground object 135, the vibrator 117 of the right controller 4 vibrates with a strength of "0.1" (this vibration is denoted by "vibration VR1"). Meanwhile, when the right front paw 142 is put on the ground object 135, the vibrator 117 of the right controller 4 vibrates with a strength of "1" (this vibration is denoted by "vibration VR2"). In this case, the vibrator 117 of the right controller 4 may be caused to vibrate such that the vibration VR1 having a strength of "0.1" and the vibration VR2 having a strength of "1" are combined.

A plurality of vibrations may be combined in accordance with the superposition principle of wave. Further, a plurality of vibrations may be combined using other methods. For example, when two vibration waveforms V1 and V2 are combined, the amplitude value of the vibration waveform V1 and the amplitude value of the vibration waveform V2 at that moment may be added up to obtain the amplitude value of a combined waveform. Further, the frequency of the vibration waveform V1 and the frequency of the vibration waveform V2 at that moment may be averaged to obtain the frequency of a combined waveform.

Further, a plurality of vibrations may be combined by using one of the plurality of waveforms that has a greatest amplitude at that moment. For example, when two vibration waveforms V1 and V2 are combined, the combined waveform may be the vibration waveform V1 if the amplitude value of the vibration waveform V1 is greater than the amplitude value of the vibration waveform V2 at that moment. Further, at another moment, if the amplitude value of the vibration waveform V2 is greater than the amplitude value of the vibration waveform V1, the combined waveform may be the vibration waveform V2.

It should be noted that, in the animation shown in FIG. 18, the animal object 140 runs using each of the four paws once. While the player character 130 is riding on the animal object 140, the animation A3 shown in FIG. 18 is repeatedly displayed. When the animation A3 is repeatedly displayed, the vibration occurring due to each paw being put on the ground object 135 occurs repeatedly.

Further, in FIG. 18, a vibration occurs at a timing when each of the four paws of the animal object 140 is put on the ground object 135. In another exemplary embodiment, attention may be paid to only two (e.g., the two front paws) of the four paws, and a vibration may occur at a timing when each of these two paws of the animal object 140 is put on the ground object 135, and a vibration does not occur when each of the other two paws (e.g., the two rear paws) is put on the ground object 135.

It should be noted that, in the exemplary embodiment, a plurality of types of ground objects 135 are provided in the virtual space. Different pieces of vibration pattern data, i.e., different vibration waveforms, are used for different types of ground objects on which the animal object 140 runs. Further, the difference in vibration strength between the left and right controllers 3 and 4 varies according to the ground object type.

FIG. 19 is a diagram showing an example of a correspondence relationship between the types of the ground objects 135 and the vibration pattern data. As shown in FIG. 19, the ground objects 135 include a stony ground object, a sandy ground object, and a boggy ground object.

For example, when the animal object 140 is running on the stony ground object, vibration pattern data P31 is used to control the vibrations of the vibrators 107 and 117 of the left and right controllers 3 and 4. Specifically, in a situation where the animal object 140 is running on the stony ground object, when the left front paw 141 of the animal object 140 is put on the stony ground object, the vibrators 107 and 117 are controlled such that the left controller 3 vibrates more strongly than the right controller 4. For example, when the left front paw 141 of the animal object 140 is put on the stony ground object, the vibrator 107 of the left controller 3 vibrates with a strength of "1," and the vibrator 117 of the right controller 4 vibrates with a strength of "0.1."

Further, when the animal object 140 is running on the sandy ground object, vibration pattern data P32 is used to control the left and right vibrators 107 and 117, and the vibration strengths of the left and right vibrators 107 and 117 are adjusted based on which of the left and right paws is put on the sandy ground object. For example, when the left front paw 141 of the animal object 140 is put on the sandy ground object, the vibrator 107 of the left controller 3 may vibrate with a strength of "1," and the vibrator 117 of the right controller 4 vibrate with a strength of "0.5."

Further, when the animal object 140 is running on the boggy ground object, vibration pattern data P33 is used to control the left and right vibrators 107 and 117, and the vibration strengths of the left and right vibrators 107 and 117 are adjusted based on which of the left and right paws is put on the boggy ground object. For example, when the left front paw 141 of the animal object 140 is put on the boggy ground object, the vibrator 107 of the left controller 3 may vibrate with a strength of "1," and the vibrator 117 of the right controller 4 may vibrate with a strength of "0.65."

By thus using different pieces of vibration pattern data for different types of ground objects 135, and changing the difference in vibration strength between the left and right controllers 107 and 117 according to the ground object type, a vibration corresponding to the ground object type can be generated. For example, when the animal object 140 is running on the stony ground object, a vibration having a relatively great strength and high frequency occurs. Further, for example, when the animal object 140 is running on the sandy ground object, a vibration occurs that is weaker than on the stony ground object and has a relatively low frequency. Further, when the animal object 140 is running on the boggy ground object, a smooth vibration occurs that has a smaller strength and a lower frequency than on the sandy ground object.

Such control allows the player to recognize on what kind of ground object the player character 130 (the animal object 140) is running, and which of the feet or paws is put on the ground object, from vibrations sensed by the left and right hands.

Fourth Example

Next, a game scene according to a fourth example will be described. In the fourth example, a vibration object that is a vibration source is provided in the virtual space. For example, the vibration object may be a rock object that rolls in the virtual space. When the vibration object rolls (moves) in the virtual space, a vibration occurs. In the fourth example, the left and right controllers 3 and 4 vibrate according to a positional relationship between the vibration object moving in the virtual space and a player character or a virtual camera.

FIG. 20 is a diagram showing an example of a vibration object 150, a player character 130, and a virtual camera 151 that are provided in the virtual space, as viewed from above.

In FIG. 20, a dashed line 155 represents a left end of an angle of view of the virtual camera 151, and a dashed line 156 represents a right end of the angle of view of the virtual camera 151. An image of the virtual space surrounded by the dashed lines 155 and 156 is generated using the virtual camera 151, and displayed on the display 12. Further, an XcYcZc coordinate system is a fixed coordinate system of the virtual camera 151. The Zc axis is an axis of the virtual camera 151 that extends in an image capture direction (line-of-sight direction), the Xc axis is an axis of the virtual camera 151 that extends rightward, and the Yc axis is an axis of the virtual camera 151 that extends upward.

As shown in FIG. 20, the vibration object 150 and the player character 130 are provided in the virtual space. The vibration object 150 moves along a path indicated by an arrow 157 of FIG. 20, for example. In this case, the vibration object 150 moves from a deeper location toward a shallower location in a depth direction in the virtual space as viewed from the virtual camera 151. When the vibration object 150 moves in the virtual space, the vibrators 107 and 117 of the left and right controllers 3 and 4 are caused to vibrate based on vibration pattern data P4. The vibration strengths of the vibrators 107 and 117 are set based on the positional relationship between the vibration object 150 and the player character 130 and/or the virtual camera 151.

Specifically, a "reference vibration strength" that is used when the vibrators 107 and 117 of the left and right controllers 3 and 4 are caused to vibrate, is determined according to a distance between the vibration object 150 and the player character 130. The reference vibration strength increases with a decrease in the distance between the vibration object 150 and the player character 130. Further, the ratio of the vibration strengths of the vibrators 107 and 117 is determined according to a direction of the vibration object 150 as viewed from the virtual camera 151 or the player character 130.

Specifically, as shown in FIG. 20, a straight line 152 is set that passes through a center CP of the player character 130 and extends parallel to a horizontal direction (Xc-axis direction) of the virtual camera 151. A reference point L is set on the straight line 152 on the left side of the player character 130, and a reference point R is set on the straight line 152 on the right side of the player character 130. The vibration strength of the vibrator 107 of the left controller 3 is determined based on an angle $\theta L$ between a vector pointing from the center CP of the player character 130 toward the reference point L and a vector pointing from the center CP toward the vibration object 150.

For example, a damping coefficient CL (e.g., ranging from 0 to 1) is calculated based on the angle $\theta L$. For example, the damping coefficient CL is set to "1" when the angle $\theta L$ is within the range of 0° to 90°. When the angle $\theta L$ exceeds 90°, the damping coefficient CL may be set to a value of less than "1." When the angle $\theta L$ is 180°, the damping coefficient CL may be set to "0." Further, for example, as the angle $\theta L$ changes from 0 to 180°, the damping coefficient CL may linearly change from 1 to 0. By multiplying the "reference vibration strength" determined according to the distance between the vibration object 150 and the player character 130 by the damping coefficient CL calculated based on the angle $\theta L$, the vibration strength of the vibrator 107 is determined.

The vibration strength of the vibrator 117 of the right controller 4 is determined in a similar manner. That is, the vibration strength of the vibrator 117 of the right controller 4 is determined according to an angle $\theta R$ between a vector pointing from the center CP of the player character 130 toward the reference point R and a vector pointing from the center CP toward the vibration object 150. A damping coefficient CR (e.g., ranging from 0 to 1) is calculated based on the angle $\theta R$. By multiplying the "reference vibration strength" determined based on the distance between the vibration object 150 and the player character 130 by the damping coefficient CR calculated based on the angle $\theta R$, the vibration strength of the vibrator 117 is determined.

For example, when the angle $\theta L$ is equal to the angle $\theta R$ (i.e., both are 90°), the vibrators 107 and 117 vibrate with the same strength. Further, when the angle $\theta L$ is less than 90° and the angle $\theta R$ is more than 90°, the vibrator 107 vibrates more strongly than the vibrator 117.

In the example of FIG. 20, the vibration object 150 approaches the virtual camera 151, moving from the left side of the virtual camera 151 (the same applies to the player character 130) toward the right side. For example, when the vibration object 150 is located at a position VP1, the distance between the vibration object 150 and the player character 130 is relatively long, and therefore, the "reference vibration strength" is relatively weak. Further, when the vibration object 150 is located at the position VP1, the vibration object 150 is located on the left side of the virtual camera 151, and therefore, the vibrator 107 of the left controller 3 vibrates more strongly than the vibrator 117 of the right controller 4.

When the vibration object 150 moves to a position VP2, the vibration object 150 is located directly in front of the virtual camera 151, and therefore, the vibrators 107 and 117 have equal vibration strengths. Further, the distance between the vibration object 150 and the player character 130 is relatively short, and therefore, the "reference vibration strength" is relatively strong.

When the vibration object 150 moves to a position VP3, the vibration object 150 is located on the right side of the virtual camera 151, and therefore, the vibrator 117 vibrates more strongly than the vibrator 107. At this time, the distance between the vibration object 150 and the player character 130 is relatively short, and therefore, the "reference vibration strength" is relatively strong.

By the left and right vibrators 107 and 117 being controlled in the above manner, the player feels vibrations that become stronger as the vibration object 150 approaches the virtual camera 151. Further, as the vibration object 150 moves from left to right on the screen (the vibration object 150 moves from the left side of the player character 130 toward the right side), the player feels that a strong vibration moves from the left hand to the right hand.

FIG. 21 is a diagram showing an example of the virtual space in which the vibration object 150, the player character 130, and the virtual camera 151 are provided, with the virtual camera 151 being turned around the player character 130, as viewed from above.

In the exemplary embodiment, the virtual camera 151 is turned around the player character 130 according to the player's operation. FIG. 21 shows the same situation as that shown in FIG. 20, except that the virtual camera 151 is turned around the player character 130.

As shown in FIG. 21, when the virtual camera 151 is turned around the player character 130, the orientation (the Zc axis) of the virtual camera 151 is changed, and the straight line 152 parallel to the Xc axis is also turned. In FIG. 21, when the vibration object 150 is located at the position VP1, the vibration object 150 is located on the line of sight of the virtual camera 151. At this time, the angles $\theta L$ and $\theta R$ are 90°, and the vibrators 107 and 117 vibrate with the same strength.

When the vibration object 150 moves to the position VP2, the vibrator 117 vibrates a little more strongly than the vibrator 107, and the "reference vibration strength" is stronger than when the vibration object 150 is located at the position VP1. When the vibration object 150 moves to the position VP3, the vibrator 117 vibrates more strongly than the vibrator 107, and the difference in strength therebetween is greater than when the vibration object 150 is located at the position VP2.

Therefore, in the case of the positional relationship of FIG. 21, the player feels stronger vibrations as the vibration object 150 approaches the virtual camera 151. The player also feels that a strong vibration moves from both hands to the right hand as the vibration object 150 moves from the center of the screen of the display 12 to the right (the vibration object 150 moves from a position directly in front of the player character 130 toward the right side).

It should be noted that the vibration strengths of the vibrators 107 and 117 may be determined using any other method that changes the vibration strengths of the vibrators 107 and 117 according to the positional relationship between the vibration object 150 and the virtual camera 151 or the player character 130. For example, the reference points R and L may be provided at locations different from those shown in FIGS. 20 and 21.

As described above, in the fourth example, the left and right vibrators 107 and 117 are controlled based on the positional relationship between the vibration object 150 and the virtual camera 151 or the player character 130.

Specifically, the "reference vibration strength" is set based on the distance between the vibration object 150 and the player character 130. Further, the vibration strengths of the left and right controllers 3 and 4 are set according to a direction pointing from the player character 130 toward the vibration object 150 and the orientation of the virtual camera 151.

Therefore, as the vibration object 150 is closer to the player character 130, the left and right controllers 3 and 4 are caused to vibrate more strongly. For example, as the vibration object 150 moves from a deeper location to a shallower location on the screen, the vibration strengths increase. Therefore, the player can recognize that the vibration source approaches the player.

Further, when the vibration object 150 is displayed on the left side of the screen, the left controller 3 vibrates more strongly. When the vibration object 150 is displayed on the right side of the screen, the right controller 4 vibrates more strongly. Further, when the vibration object 150 is displayed on the left side of the player character 130, the left controller 3 vibrates more strongly. When the vibration object 150 is displayed on the right side of the player character 130, the right controller 4 vibrates more strongly. As a result, the player can recognize whether the vibration object 150 is located on the left or right side of the virtual camera, based on the vibrations of the left and right controllers 3 and 4, and whether the vibration object 150 is located on the left or right side of the player character 130.

For example, the state of the left and right controllers 3 and 4 is changed from the state in which the left controller 3 vibrates more strongly to the state in which the right controller 4 vibrates more strongly, in response to the movement of the vibration object 150 from the left side to the right side of the screen. Therefore, the player can recognize that the vibration source moves from the left side to the right side of the screen. Further, for example, the state of the left and right controllers 3 and 4 is changed from the state in which the left controller 3 vibrates more strongly to the state in which the right controller 4 vibrates more strongly, in response to the movement of the vibration object 150 from the left side to the right side of the player character 130. Therefore, the player can recognize that the vibration source moves from the left side to the right side of the player character 130.

As described above, in the fourth example, the left and right vibrators 107 and 117 are controlled based on the positional relationship between the vibration object 150 and the virtual camera 151 or the player character 130. This allows the player to feel a vibration corresponding to a location of the vibration object 150 on the screen, and a vibration corresponding to a location of the vibration object 150 as viewed from the player character 130.

Further, in the exemplary embodiment, even when the vibration object 150 is not located within the image capture range of the virtual camera 151, the vibrators 107 and 117 are caused to vibrate based on a direction of the vibration object 150 as viewed from the virtual camera 151 or the player character 130. As a result, by feeling such vibrations, the player can know in what direction the vibration object 150 is located relative to the virtual camera 151 or the player character 130, even without viewing the vibration object 150.

It should be noted that the vibrations described in the first to fourth examples may occur simultaneously. For example, the vibration based on the vibration object 150 described in the fourth example may occur simultaneously with the vibration described in the second example. For example, as shown in FIG. 15, there may be a case where while the player character 130 is moving to left or right, hanging from the wall object 136, the vibration object 150 shown in the fourth example moves toward the player character 130. In this case, a vibration that occurs when the right hand of the player character 130 is put on the wall object 136, which is described in the second example, and a vibration that occurs when the vibration object 150 moves toward the player character 130, may be combined.

Further, for example, as shown in FIG. 10, there may be a case where while the player character 130 is dropping with its right hand being on the wall object 136, the vibration object 150 shown in the fourth example moves toward the player character 130. In this case, the vibration described in the first example and the vibration described in the fourth example may be combined. Further, as shown in FIG. 16, there may be a case where while the player character 130 is riding on the animal object 140, the vibration object 150 described in the fourth example moves toward the player character 130. In this case, the vibration described in the third example and the vibration described in the fourth example may be combined.

A plurality of vibration waveforms may be combined in accordance with the superposition principle of wave. Further, the amplitude and frequency of a combined waveform may be calculated by adding up the amplitudes of vibration waveforms and calculating the average of the frequencies of the vibration waveforms. Further, a plurality of vibration waveforms may be combined by using one of the plurality of vibration waveforms that has a greatest amplitude at that moment.

It should be noted that a plurality of vibration waveforms may be combined either in the main body apparatus 2 or in the left and right controllers 3 and 4. For example, the main body apparatus 2 may generate a vibration control signal indicating a combined waveform produced by combining a plurality of vibration waveforms, and transmit the generated vibration control signal to the left and right controllers 3 and 4. Further, the main body apparatus 2 may generate and output vibration control signals corresponding to a plurality of vibration waveforms, and the left and right controllers 3 and 4 may combine the received vibration control signals.

(Details of Process)

Next, a process performed in the main body apparatus 2 of the game system 1 will be described in detail. Data stored in the main body apparatus 2 will be firstly described. Afterwards, a description of an information process performed in the main body apparatus 2 will be provided. FIG. 22 is a diagram showing an example of data stored in the main body apparatus 2.

As shown in FIG. 22, the main body apparatus 2 stores a game program D101, operation data D102, character data D103, virtual camera data D104, object data D105, vibration pattern data D106, animation data D107, a left vibration control signal D108, and a right vibration control signal D109. It should be noted that the main body apparatus 2 stores various other data and programs in addition to those shown in FIG. 22.

The game program D101 is for executing a game including the features of the first to fourth examples.

The operation data D102 corresponds to operations performed on the left and right controllers 3 and 4, and is transmitted from the left and right controllers 3 and 4. In the exemplary embodiment, the main body apparatus 2 communicates with the left and right controllers 3 and 4 at predetermined time intervals (e.g., intervals of ½₀₀ sec). In the communication, the left and right controllers 3 and 4 transmit the operation data D102 to the main body apparatus 2. Further, in the communication, the left and right vibration control signals D108 and D109 are transmitted from the main body apparatus 2 to the left and right controllers 3 and 4, respectively.

The character data D103 contains information related to the location, orientation, movement speed, movement direction, etc., of the player character 130.

The virtual camera data D104 contains information related to the location and orientation of the virtual camera provided in the virtual space.

The object data D105 contains information related to objects (e.g., the ground object 135, the wall object 136, and the vibration object 150) provided in the virtual space. The types and number of objects provided in the virtual space vary according to the game scenes described in the first to fourth examples. For example, when the game scene described in the first or second example is executed, the ground object 135 and the wall object 136 are provided in the virtual space, and information related to these objects (locations, shapes, sizes, types, etc.) is stored as the object data D105. Further, when the game scene described in the third example is executed, a plurality of different types of ground objects 135 are provided in the virtual space. Further, when the game scene described in the fourth example is executed, the vibration object 150 is provided in the virtual space. In this case, information related to the location, shape, size, type, movement speed, movement direction, etc., of the vibration object 150 is stored as the object data D105.

The vibration pattern data D106 indicates the waveforms of the vibrations that occur together with display of the animations described in the first to fourth examples. For example, when the game scene described in the first example is executed, the vibration pattern data P1 is stored as the vibration pattern data D106. Further, when the game scene described in the second example is executed, the vibration pattern data P2 is stored as the vibration pattern data D106. Further, when the game scene described in the third example is executed, the vibration pattern data P31 to P33 is stored as the vibration pattern data D106. Further, when the game scene described in the fourth example is executed, the vibration pattern data P4 is stored as the vibration pattern data D106.

The animation data D107 is for displaying the animations described in the first to third examples. For example, when the game scene described in the first example is executed, the animation A1 is stored as the animation data D107. Further, when the game scene described in the second example is executed, the animation A2 is stored as the animation data D107. When the game scene described in the third example is executed, the animation A3 is stored as the animation data D107.

The left vibration control signal D108 is data indicating the first vibration control signal for causing the vibrator 107 of the left controller 3 to vibrate, and includes the frequency and amplitude of a vibration. The right vibration control signal D109 is data indicating the second vibration control signal for causing the vibrator 117 of the right controller 4 to vibrate, and includes the frequency and amplitude of a vibration.

Next, processes performed in the main body apparatus 2 will be described in detail. Firstly, a process that is performed when the game scene according to the first example is executed will be described.

(Details of Process of First Example)

Figure 23:
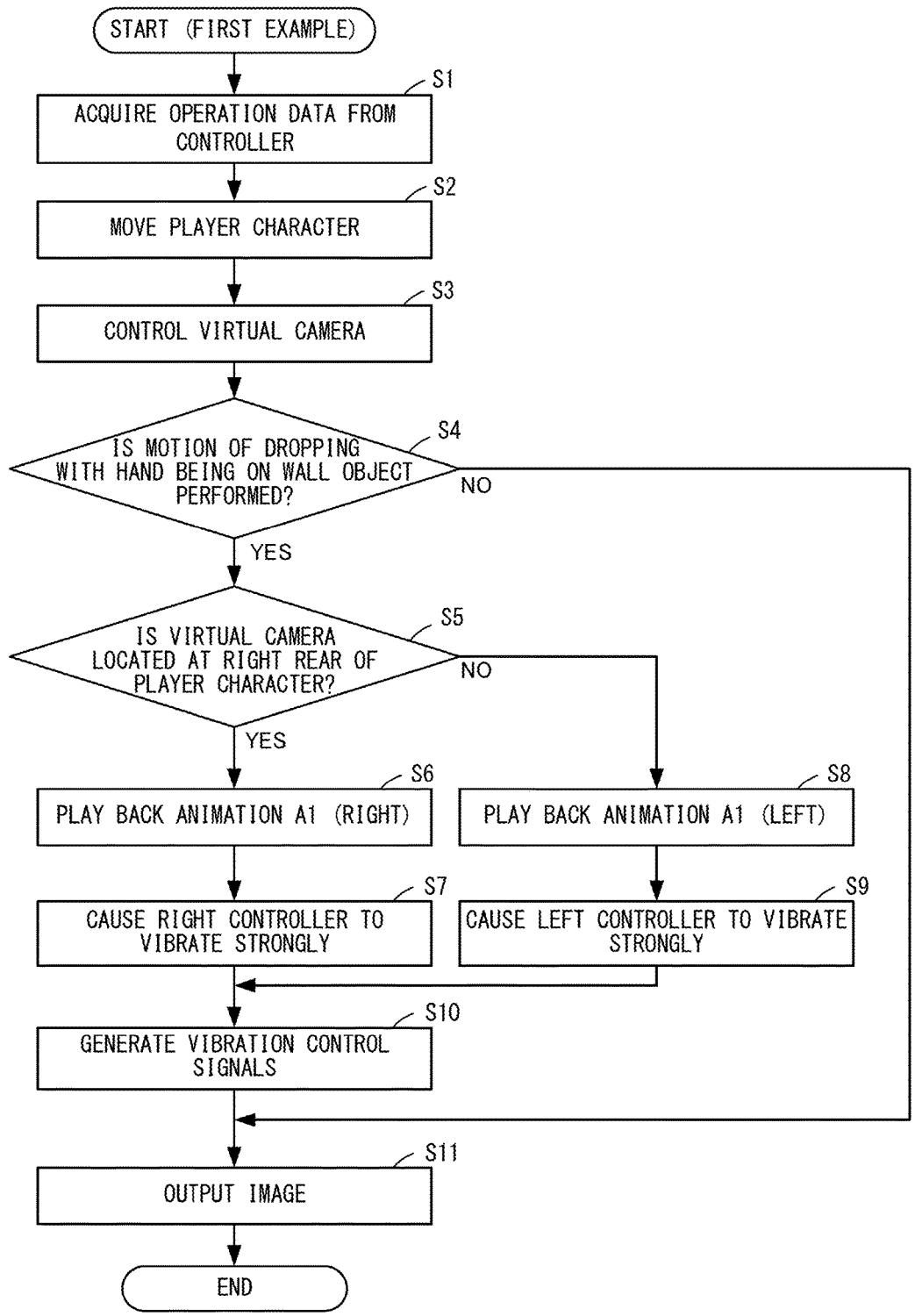
FIG. 23 is an example non-limiting flowchart showing details of an information process that is performed in a main body apparatus 2 when a game scene according to a first example is executed.

FIG. 23 is a flowchart showing details of an information process that is performed in the main body apparatus 2 when the game scene according to the first example is executed. The process shown in FIG. 23 is performed by the processor 81 of the main body apparatus 2 executing the game program D101 (information processing program). The processor 81 of the main body apparatus 2 repeatedly executes the process of FIG. 23 at intervals of, for example, ⅟₆₀ sec (called a one-frame time).

As shown in FIG. 23, the processor 81 of the main body apparatus 2 (hereinafter simply referred to as "the main body apparatus 2") acquires operation data transmitted from the left and right controllers 3 and 4 (step S1). Specifically, the left and right controllers 3 and 4 transmit operation data corresponding to an operation to the main body apparatus 2 at predetermined time intervals (e.g., intervals of ½₀₀ sec). The main body apparatus 2 temporarily stores the operation data transmitted from the left and right controllers 3 and 4 in a DRAM 85. In step S1, the main body apparatus 2 acquires the operation data stored in the DRAM 85.

Next, the main body apparatus 2 causes the player character 130 to perform a motion in the virtual space, based on the acquired operation data (step S2). For example, when the stick 32 of the left controller 3 is operated, the main body apparatus 2 causes the player character 130 to move in the virtual space in a direction corresponding to the operation direction of the stick 32, and updates the location and orientation of the player character 130. Further, for example, when an operation button (e.g., the A-button 53) of the right controller 4 is pressed down, the main body apparatus 2 causes the player character 130 to jump in the virtual space, and updates the location and orientation of the player character 130. The main body apparatus 2 stores the updated location and orientation of the player character 130 as the character data D103.

Following step S2, the main body apparatus 2 controls the virtual camera, based on the acquired operation data (step S3). For example, when the stick 52 of the right controller 4 is operated, the main body apparatus 2 causes the virtual camera to move around the player character 130 according to the operation direction of the stick 52, and updates the location and orientation of the virtual camera. The main body apparatus 2 stores the location and orientation of the virtual camera as the virtual camera data D104. For example, the virtual camera is located at the rear of the player character 130 in an initial state thereof, and is moved to the right rear or left rear of the player character 130 according to the operation of the stick 52.

Following step S3, the main body apparatus 2 determines whether or not the player character 130 is performing a motion of dropping in the virtual space with its hand being on the wall object 136 (step S4). For example, when the player character 130 is located within a predetermined range of the wall object 136, then if the player character 130 is performing a motion of jumping toward the wall object 136 in the process of step S2, the determination result in step S4 is positive ("YES"). Further, if, prior to the current process loop, the player character 130 has been being performing a motion of dropping in the virtual space with its hand being on the wall object 136, and the player character 130 has not yet reached the ground object 135, the determination result in step S4 is also positive ("YES").

If the main body apparatus 2 determines that the player character 130 is performing a motion of dropping in the virtual space with its hand being on the wall object 136 (step S4: YES), the main body apparatus 2 determines whether or not the virtual camera is located at the right rear of the player character 130 (step S5).

If the main body apparatus 2 determines that the virtual camera is located at the right rear of the player character 130 (step S5: YES), the main body apparatus 2 plays back the animation A1 (right) (step S6). In the first example, previously stored are the animation A1 (right) in which the player character 130 performs a motion of dropping in the virtual space with its right hand being on the wall object 136, and the animation A1 (left) in which the player character 130 performs a motion of dropping in the virtual space with its left hand being on the wall object 136. In step S6, the main body apparatus 2 plays back the animation A1 (right) which is previously stored. It should be noted that, in the exemplary embodiment, while the animation A1 is being played back (i.e., the player character 130 is dropping with its hand being on the wall object 136), the control of the virtual camera in step S3 is stopped. That is, while the player character 130 is dropping with its hand being on the wall object 136, the virtual camera is not turned, and the same animation A1 is played back until the player character 130 has reached the ground object 135. Specifically, once the playback of the animation A1 (right) is started, the determinations results in steps S4 and S5 continue to be "YES," and the animation A1 (right) continues to be played back, until the player character 130 has reached the ground object 135. As a result, as shown in FIG. 11, a situation is displayed in which the player character 130 is dropping with its left hand (hand on the right side as viewed from the player) being on the wall object 136.

Following step S6, the main body apparatus 2 causes the vibrators 107 and 117 of the left and right controllers 3 and 4 to vibrate such that the right controller 4 vibrates more strongly than the left controller 3 (step S7). Specifically, the main body apparatus 2 calculates the frequency and amplitude of a vibration of the vibrator 107 and the frequency and amplitude of a vibration of the vibrator 117, based on the vibration pattern data P1. For example, the main body apparatus 2 reads a frequency and an amplitude from the vibration pattern data P1, and calculates the amplitude of a vibration of the vibrator 107 by multiplying the read amplitude by "0.4." Further, the main body apparatus 2 reads a frequency and an amplitude from the vibration pattern data P1, and calculates the amplitude of a vibration of the vibrator 117 by multiplying the read amplitude by "1."

Meanwhile, if the main body apparatus 2 does not determine that the virtual camera is located at the right rear of the player character 130 (step S5: NO), the main body apparatus 2 plays back the animation A1 (left) (step S8). Once the playback of the animation A1 (left) is started, the determination result in step S4 continues to be "YES," and the determination result in step S5 continues to be "NO," until the player character 130 has reached the ground object 135. As a result, as shown in FIG. 10, a situation is displayed in which the player character 130 is dropping with its right hand (hand on the left side as viewed from the player) being on the wall object 136.

Following step S8, the main body apparatus 2 causes the vibrators 107 and 117 of the left and right controllers 3 and 4 to vibrate such that the left controller 3 vibrates more strongly than the right controller 4 (step S7). Specifically, the main body apparatus 2 calculates the frequency and amplitude of a vibration of the vibrator 107 and the frequency and amplitude of a vibration of the vibrator 117, based on the vibration pattern data P1. For example, the main body apparatus 2 reads a frequency and an amplitude from the vibration pattern data P1, and calculates the amplitude of a vibration of the vibrator 117 by multiplying the read amplitude by "0.4." Further, the main body apparatus 2 reads a frequency and an amplitude from the vibration pattern data P1, and calculates the amplitude of a vibration of the vibrator 107 by multiplying the read amplitude by "1."

When step S7 or step S9 is executed, the main body apparatus 2 generates the left vibration control signal D108 containing the frequency and amplitude of the vibrator 107 calculated in step S7 or S9, and the right vibration control signal D109 containing the frequency and amplitude of the vibrator 117 calculated in step S7 or S9 (step S10). The left and right vibration control signals D108 and D109 generated in step S11 are transmitted from the main body apparatus 2 to the left and right controllers 3 and 4, respectively.

If step S10 has been executed or the determination result in step S4 is negative ("NO"), the main body apparatus 2 generates an image of the virtual space using the virtual camera, and outputs the generated image to the display 12 (step S11). The description of FIG. 23 is ended.

(Details of Process of Second Example)

Figure 24:
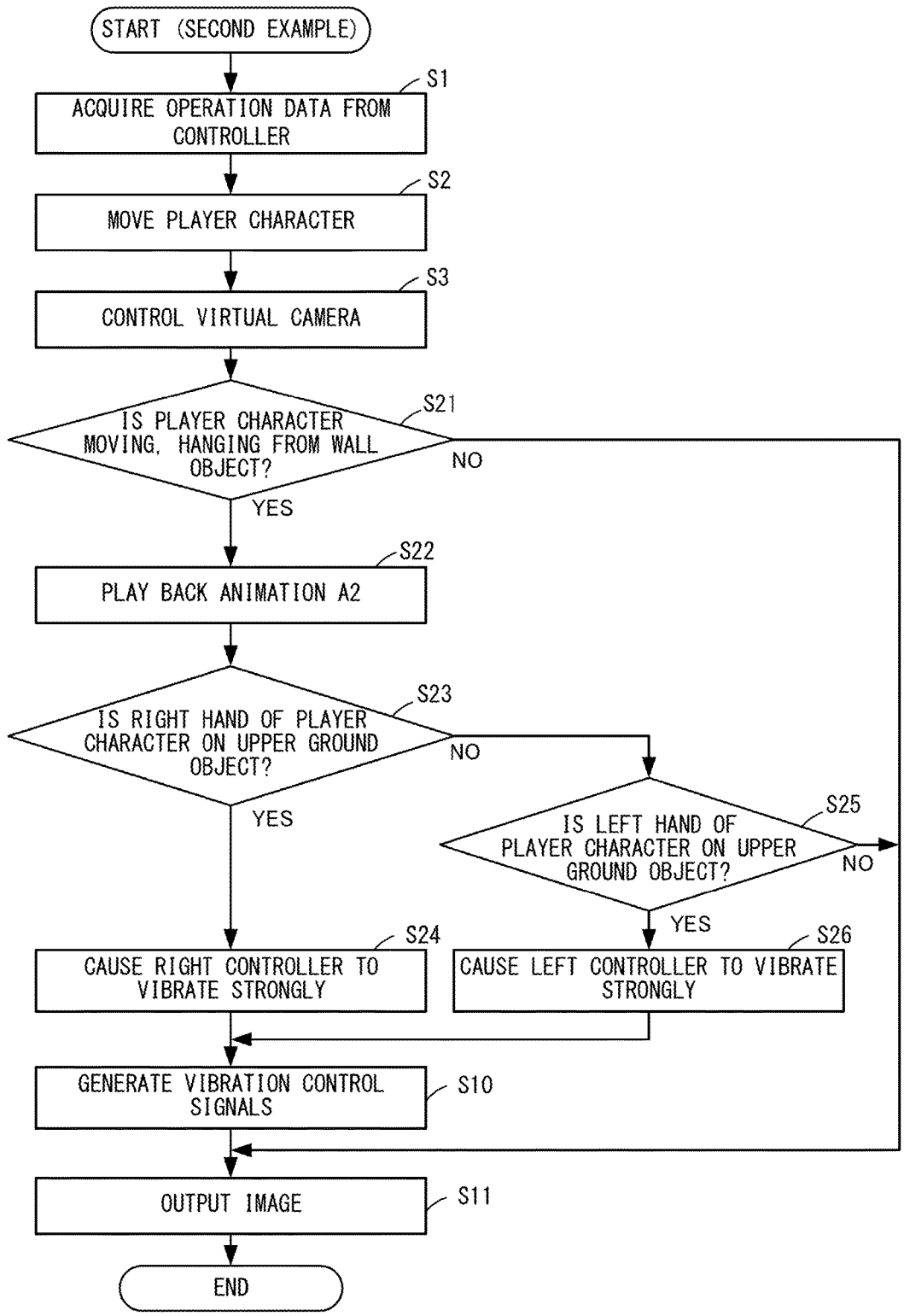
FIG. 24 is an example non-limiting flowchart showing details of an information process that is performed in a main body apparatus 2 when a game scene according to a second example is executed.

Next, a process that is performed when the game scene according to the second example is executed will be described in detail. FIG. 24 is a flowchart showing details of an information process that is performed in the main body apparatus 2 when the game scene according to the second example is executed. It should be noted that the process shown in FIG. 24 is repeatedly executed at intervals of, for example, 1/60 sec (called a one-frame time). Further, in FIG. 24, steps similar to those of FIG. 23 are indicated by the same reference characters and will not be described.

As shown in FIG. 24, after steps S1 to S3, the main body apparatus 2 determines whether or not the player character 130 is moving, hanging from the wall object 136 (step S21). Specifically, if the determination result in step S2 indicates that the player character 130 is hanging from the upper end portion of the wall object 136, then when "left" or "right" is input using the stick 32 of the left controller 3, the determination result in step S4 is positive ("YES").

If the main body apparatus 2 determines that the player character 130 is moving, hanging from the wall object 136 (step S21: YES), the main body apparatus 2 plays back the animation A2 (step S22). Here, if "right" has been input using the stick 32, the animation A2 (right) is played back. If "left" has been input using the stick 32, the animation A2 (left) is played back.

Following step S22, the main body apparatus 2 determines whether or not the right hand of the player character 130 is on the upper end portion of the wall object 136 (step S23). Specifically, the main body apparatus 2 determines whether or not the right hand of the player character 130 is on the upper end portion of the wall object 136, based on the number of frames that have been displayed since the start of playback of the animation A2 in step S22. For example, the main body apparatus 2 determines whether or not the current time is within a predetermined frame period (e.g., during a period of time corresponding to the fifth to tenth frames from the start of playback of the animation A2 in step S22).

If the determination result in step S23 is positive ("YES"), the main body apparatus 2 causes the vibrators 107 and 117 of the left and right controllers 3 and 4 to vibrate such that the right controller 4 vibrates more strongly than the left controller 3 (step S24). Specifically, the main body apparatus 2 calculates the frequency and amplitude of a vibration of the vibrator 107 and the frequency and amplitude of a vibration of the vibrator 117, based on the vibration pattern data P2. For example, the main body apparatus 2 reads a frequency and an amplitude from the vibration pattern data P2, and calculates the amplitude of a vibration of the vibrator 107 by multiplying the read amplitude by "0.3." Further, the main body apparatus 2 reads a frequency and an amplitude from the vibration pattern data P2, and calculates the amplitude of a vibration of the vibrator 117 by multiplying the read amplitude by "1."

If the determination result in step S23 is negative ("NO"), the main body apparatus 2 determines whether or not the left hand of the player character 130 is on the upper end portion of the wall object 136 (step S25). Specifically, the main body apparatus 2 determines whether or not the left hand of the player character 130 is on the upper end portion of the wall object 136, based on the number of frames that have been displayed since the start of playback of the animation A2 in step S22.

If the determination result in step S25 is positive ("YES"), the main body apparatus 2 causes the vibrators 107 and 117 of the left and right controllers 3 and 4 to vibrate such that the left controller 3 vibrates more strongly than the right controller 4 (step S26). Specifically, the main body apparatus 2 calculates the frequency and amplitude of a vibration of the vibrator 107 and the frequency and amplitude of a vibration of the vibrator 117, based on the vibration pattern data P2. For example, the main body apparatus 2 reads a frequency and an amplitude from the vibration pattern data P2, and calculates the amplitude of a vibration of the vibrator 117 by multiplying the read amplitude by "0.3." Further, the main body apparatus 2 reads a frequency and an amplitude from the vibration pattern data P2, and calculates the amplitude of a vibration of the vibrator 107 by multiplying the read amplitude by "1."

When step S24 or step S26 is executed, the main body apparatus 2 generates the left and right vibration control signals D108 and D109, based on the calculation results in step S24 or S26 (step S10). The left and right vibration control signals D108 and D109 thus generated are transmitted from the main body apparatus 2 to the left and right controllers 3 and 4, respectively.

If step S10 has been executed, the determination result in step S21 is negative ("NO"), or the determination result in step S25 is negative ("NO"), the main body apparatus 2 generates an image of the virtual space using the virtual camera, and outputs the generated image (step S11). The description of FIG. 24 is ended.

(Details of Process of Third Example)

Figure 25:
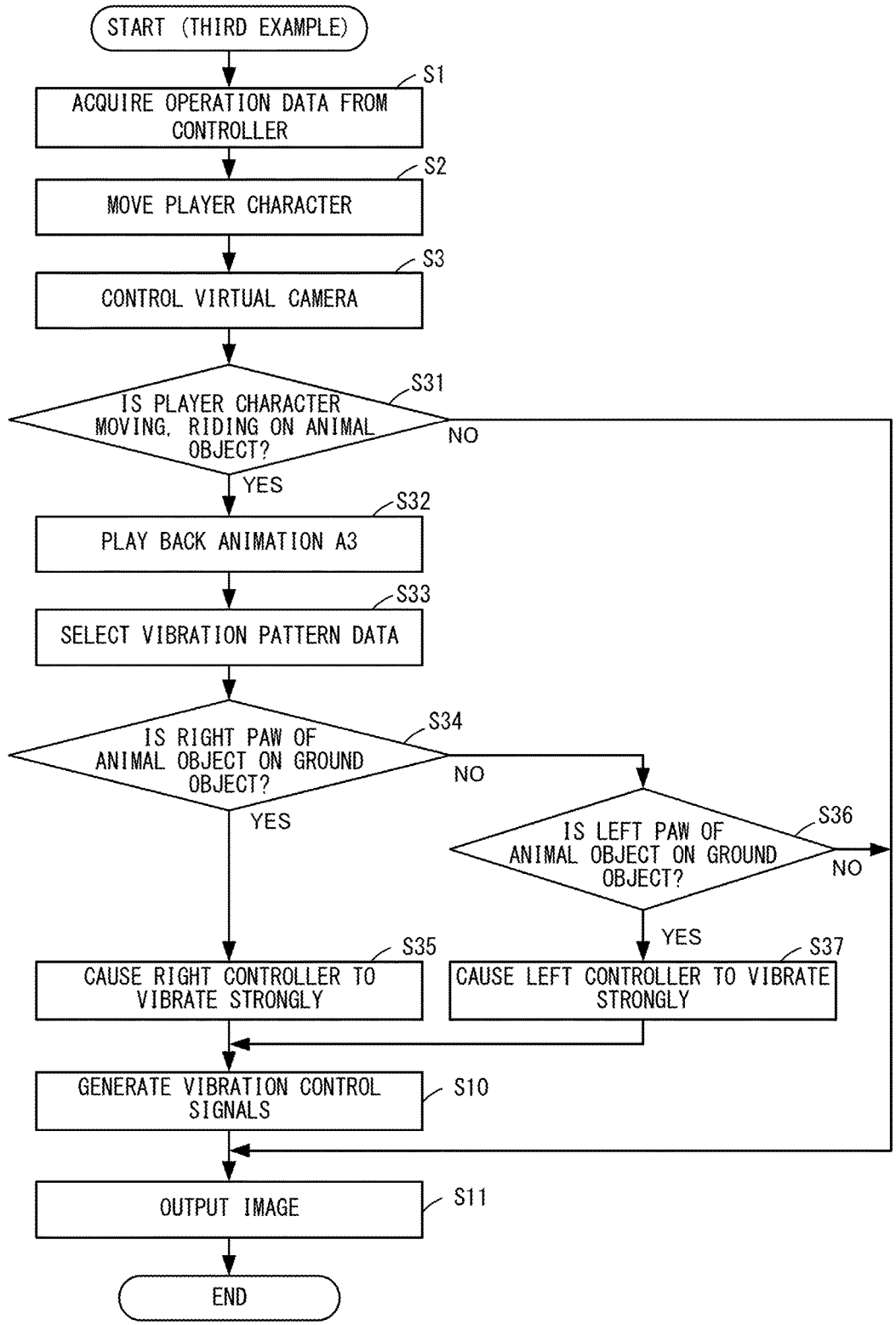
FIG. 25 is an example non-limiting flowchart showing details of an information process that is performed in a main body apparatus 2 when a game scene according to a third example is executed.

Next, a process that is performed when the game scene according to the third example is executed will be described in detail. FIG. 25 is a flowchart showing details of an information process that is performed in the main body apparatus 2 when the game scene according to the third example is executed. It should be noted that the process shown in FIG. 25 is repeatedly executed at intervals of, for example, 1/60 sec (called a one-frame time). Further, in FIG. 25, steps similar to those of FIG. 23 are indicated by the same reference characters and will not be described.

As shown in FIG. 25, after steps S1 to S3, the main body apparatus 2 determines whether or not the player character 130 is moving, riding on the animal object 140 (step S31). Specifically, if the player character 130 has mounted the animal object 140 as a result of step S2, the determination result in step S31 is positive ("YES"). It should be noted that once the player character 130 has mounted the animal object 140, the player character 130 continues to ride on the animal object 140 until a predetermined condition has been satisfied (e.g., until the player has performed an operation to cause the player character 130 to dismount the animal object 140). In this state, in step S2, the movement direction and speed of the animal object 140 may be changed based on the operation data.

If the main body apparatus 2 determines that the player character 130 is moving, riding on the animal object 140 (step S31: YES), the main body apparatus 2 plays back the animation A3 (step S32). Here, the determination result in step S31 is positive ("YES") as long as the player character 130 continues to ride on the animal object 140.

Following step S32, the main body apparatus 2 selects vibration pattern data (step S33). Specifically, the main body apparatus 2 determines on which of the ground objects 135 (a stony ground object, a sandy ground object, and a boggy ground object) provided in the virtual space the animal object 140 is located, based on the location of the animal object 140. Thereafter, the main body apparatus 2 selects vibration pattern data (one of the vibration pattern data P31 to P33) corresponding to the identified ground object 135.

Next, the main body apparatus 2 determines whether or not a right paw (the right front paw or the right rear paw) of the animal object 140 is on the ground object 135 (step S34). Specifically, the main body apparatus 2 determines whether or not a right paw of the animal object 140 is on the ground object 135, based on the number of frames that have been displayed since the start of playback of the animation A3 in step S32. For example, the main body apparatus 2 determines whether or not the current time is within a predetermined frame period (e.g., during a period of time corresponding to the fifth to tenth frames from the start of playback of the animation A3 in step S32).

If the determination result in step S34 is positive ("YES"), the main body apparatus 2 causes the vibrators 107 and 117 of the left and right controllers 3 and 4 to vibrate such that the right controller 4 vibrates more strongly than the left controller 3 (step S35). Specifically, the main body apparatus 2 calculates the frequency and amplitude of a vibration of the vibrator 107 and the frequency and amplitude of a vibration of the vibrator 117, based on the vibration pattern data selected in step S33. For example, if the main body apparatus 2 has selected the vibration pattern data P31 in step S33, the main body apparatus 2 reads a frequency and an amplitude from the vibration pattern data P31, and calculates the amplitude of a vibration of the vibrator 107 by multiplying the read amplitude by "0.1." Further, the main body apparatus 2 reads a frequency and an amplitude from the vibration pattern data P31 selected in step S33, and calculates the amplitude of a vibration of the vibrator 117 by multiplying the read amplitude by "1."

Further, for example, if the main body apparatus 2 has selected the vibration pattern data P32 in step S33, the main body apparatus 2 reads a frequency and an amplitude from the vibration pattern data P32, and calculates the amplitude of a vibration of the vibrator 107 by multiplying the read amplitude by "0.5." Further, the main body apparatus 2 reads a frequency and an amplitude from the vibration pattern data P32 selected in step S33, and calculates the amplitude of a vibration of the vibrator 117 by multiplying the read amplitude by "1."

If the determination result in step S34 is negative ("NO"), the main body apparatus 2 determines whether or not a left paw (the left front paw or the left rear paw) of the animal object 140 is on the ground object 135 (step S36). As in step S34, the main body apparatus 2 performs the determination of step S36, based on the number of frames that have been displayed since the start of playback of the animation A3 in step S32.

If the determination result in step S36 is positive ("YES"), the main body apparatus 2 causes the vibrators 107 and 117 of the left and right controllers 3 and 4 to vibrate such that the left controller 3 vibrates more strongly than the right controller 4 (step S37). Specifically, the main body apparatus 2 calculates the frequency and amplitude of a vibration of the vibrator 107 and the frequency and amplitude of a vibration of the vibrator 117, based on the vibration pattern data selected in step S33. For example, if the main body apparatus 2 has selected the vibration pattern data P31 in step S33, the main body apparatus 2 reads a frequency and an amplitude from the vibration pattern data P31, and calculates the amplitude of a vibration of the vibrator 117 by multiplying the read amplitude by "0.1." Further, the main body apparatus 2 reads a frequency and an amplitude from the vibration pattern data P31 selected in step S33, and calculates the amplitude of a vibration of the vibrator 107 by multiplying the read amplitude by "1."

Further, for example, if the main body apparatus 2 has selected the vibration pattern data P32 in step S33, the main body apparatus 2 reads a frequency and an amplitude from the vibration pattern data P32, and calculates the amplitude of a vibration of the vibrator 117 by multiplying the read amplitude by "0.5." Further, the main body apparatus 2 reads a frequency and an amplitude from the vibration pattern data P32 selected in step S33, and calculates the amplitude of a vibration of the vibrator 107 by multiplying the read amplitude by "1."

If step S35 or step S37 has been executed, the main body apparatus 2 generates the left and right vibration control signals D108 and D109, based on the results in step S35 or S37 (step S10). The left and right vibration control signals D108 and D109 thus generated are transmitted from the main body apparatus 2 to the left and right controllers 3 and 4, respectively.

If step S10 has been executed, the determination result in step S31 is negative ("NO"), or the determination result in step S36 is negative ("NO"), the main body apparatus 2 generates an image of the virtual space using the virtual camera, and outputs the generated image (step S11). The description of FIG. 25 is ended.

(Details of Process of Fourth Example)

Figure 26:
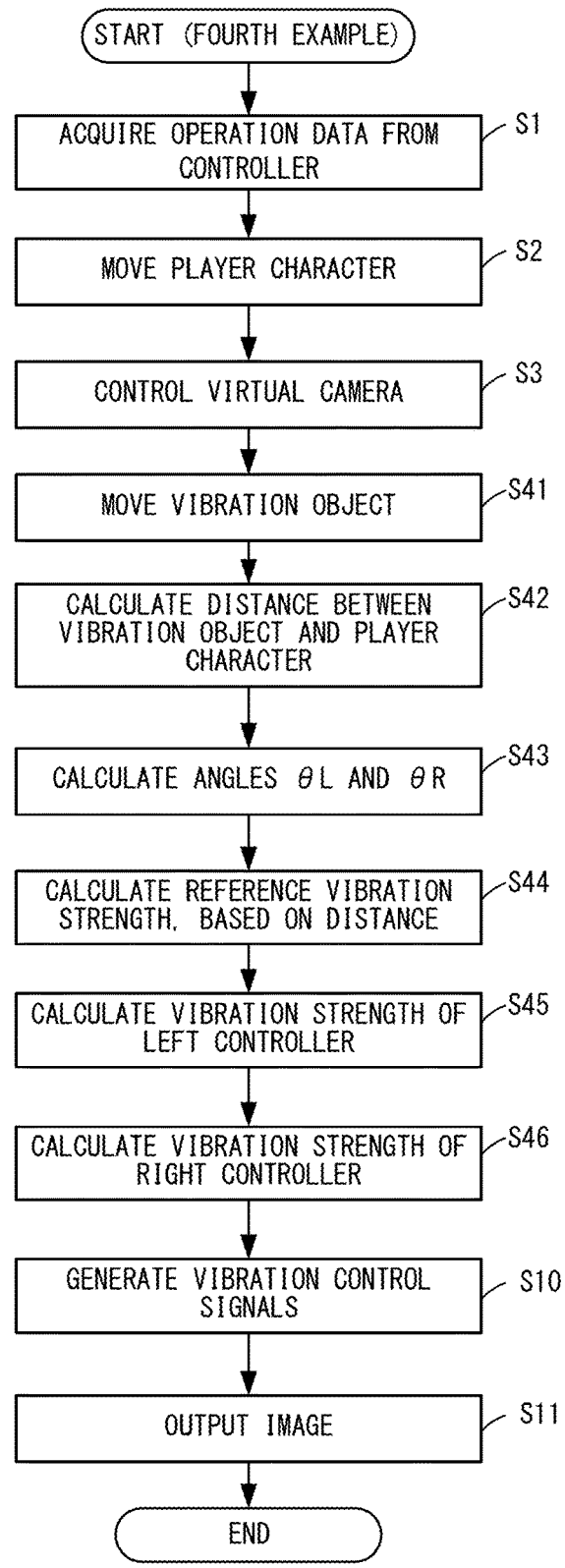
FIG. 26 is an example non-limiting flowchart showing details of an information process which is performed in a main body apparatus 2 when a game scene according to a fourth example is executed.

Next, a process that is performed when the game scene according to the fourth example is executed will be described in detail. FIG. 26 is a flowchart showing details of an information process which is performed in the main body apparatus 2 when the game scene according to the fourth example is executed. It should be noted that the process shown in FIG. 26 is repeatedly executed at intervals of, for example, ⅟60 sec (called a one-frame time). Further, in FIG. 26, steps similar to those of FIG. 23 are indicated by the same reference characters and will not be described.

As shown in FIG. 26, after steps S1 to S3, the main body apparatus 2 causes the vibration object 150 to move in the virtual space (step S41). Next, the main body apparatus 2 calculates the distance between the vibration object 150 and the player character 130 (step S42).

Next, the main body apparatus 2 calculates the angles θL and θR (see FIGS. 20 and 21) (step S43). Specifically, the main body apparatus 2 calculates the straight line 152 connecting the player character 130 and the reference point L, and a straight line 153 connecting the player character 130 and the vibration object 150. The main body apparatus 2 also calculates the angles θL and θR between the straight lines 152 and 153.

Next, the main body apparatus 2 calculates the reference vibration strength, based on the distance calculated in step S42 (step S44). Specifically, the main body apparatus 2 calculates the amplitude of a vibration, based on the vibration pattern data P4. Thereafter, the main body apparatus 2 calculates the reference vibration strength by multiplying the amplitude calculated based on the vibration pattern data P4 by a coefficient that is determined according to the distance calculated in step S42. Further, the main body apparatus 2 calculates the frequency of the vibration, based on the vibration pattern data P4.

Next, the main body apparatus 2 calculates the vibration strength of the vibrator 107 of the left controller 3 (step S45). For example, the main body apparatus 2 calculates the vibration strength of the vibrator 107 of the left controller 3 by multiplying the reference vibration strength calculated in step S44 by a coefficient (ranging from 0 to 1) corresponding to the angle θL.

Next, the main body apparatus 2 calculates the vibration strength of the vibrator 117 of the right controller 4 (step S46). For example, the main body apparatus 2 calculates the vibration strength of the vibrator 117 of the right controller 4 by multiplying the reference vibration strength calculated in step S44 by a coefficient (ranging from 0 to 1) corresponding to the angle θR.

Next, the main body apparatus 2 generates the left vibration control signal D108, based on the frequency calculated in step S44 and the vibration strength of the left controller 3 calculated in step S45 (step S10). Further, the main body apparatus 2 generates the right vibration control signal D109, based on the frequency calculated in step S44 and the vibration strength of the right controller 4 calculated in step S46. Thereafter, the main body apparatus 2 generates an image of the virtual space as viewed from the virtual camera, and outputs the image (step S11). The description of FIG. 26 is ended.

It should be noted that the steps shown in FIGS. 23 to 26 are merely illustrative. For example, the steps may be executed in a different order, other steps may be added, or a portion of the steps may be removed. Further, the numerical values used in the steps are merely illustrative. Other values may be used.

As described above, in the exemplary embodiment, the left and right controllers 3 and 4 are caused to vibrate according to a state of an operation object (e.g., the state in which a player character is dropping with its left hand being on a wall, the state in which a player character puts its left or right hand on a wall during its movement, the state in which its left or right paw is put on a ground animal object during its movement, etc.). Therefore, the player can recognize, from the vibration, the state of the operation object. The left and right controllers 3 and 4 vibrate according to a state of a motion of an operation object, and therefore, the player can know the state of the motion of the operation object. Further, a vibration occurs according to a state of a motion of an operation object that is operatred by the player itself. Therefore, the player is allowed to feel as if the player itself existed in the virtual space, resulting in an increase in sense of realism of the game.

Further, the vibration strengths of the left and right controllers 3 and 4 are changed according to the left-or-right state of an operation object (which of the left and right hands is on a wall, etc., or which of the left and right paw is on a ground, etc.). Therefore, the player can recognize the left-or-right state of the operation object. Specifically, when a predetermined event is occurring on a left portion of a player character (e.g., a case where a hand on the left side of a player character as viewed from a player is on a wall as in the first example, a case where the left hand of a player character is on an upper end portion of a wall as in the second example, and a case where a left paw of an animal object is on a ground as in the third example), the left controller 3 held by the left hand of the player vibrates more strongly than the right controller 4. Further, when a predetermined event is occurring on a right portion of a player character, the right controller 4 held by the right hand of the player vibrates strongly than the left controller 3. Therefore, the player can recognize on which of the left and right portions of the player character a predetermined event is occurring.

Further, in the fourth example, the vibrations of the left and right controllers 3 and 4 are controlled based on the positional relationship between the vibration object 150 and the virtual camera 151 or the player character 130. The vibration strengths of the left and right controllers 3 and 4 are changed according to the location on the screen of the vibration object 150. Therefore, the player can recognize, from the vibrations, where the vibration object 150 is located in the virtual space. Further, the vibration strengths of the left and right controllers 3 and 4 are changed according to the direction of the vibration object 150 as viewed from the player character 130. Therefore, the player can recognize, from the vibrations, to which of the left and right of the player character 130 the vibration object 150 is located.

(Variations)

In the foregoing, the exemplary embodiment has been described. In other exemplary embodiments, the following features may be provided.

For example, in the first example, in a state (first state) in which the left hand of the player character 130 is on the wall object 136, a situation is displayed on the screen in which a hand on the right side is on the wall object 136, and therefore, the right controller 4 is caused to vibrate strongly. Further, in a state (second state) in which the right hand of the player character 130 is on the wall object 136, a situation is displayed on the screen in which a hand on the left side is on the wall object 136, and therefore, the left controller 3 is caused to vibrate strongly. In another exemplary embodiment, no matter whether the hand of the player character 130 is positioned on the left or right side as viewed from the player, the left controller 3 may be caused to vibrate strongly in the state (first state) in which the left hand of the player character 130 is on the wall object 136, and the right controller 4 may be caused to vibrate strongly in the state (second state) in which the right hand of the player character 130 is on the wall object 136.

Further, in the first example, one of the left and right hands of the player character 130 that is to be put on the wall object 136 is selected based on the location of the virtual camera. That is, one of the animation A1 (right) and the animation A1 (left) is selected based on whether the virtual camera is located at the right rear or left rear of the player character 130. In another exemplary embodiment, the player character 130 may be caused to be in the first state (the left hand of the player character 130 is on the wall object 136) or in the second state (the right hand of the player character 130 is on the wall object 136), based on at least one of a state of the virtual space, a state of the player character 130, and an operation performed by the user, instead of or in addition to the location of the virtual camera. For example, the first state or the second state may be selected according to a type or arrangement of the wall object 136, a positional relationship between the wall object 136 and the player character 130, a type or arrangement of a second object in the virtual space, a positional relationship between that second object and the player character 130, a state of the player character 130 (a location, an orientation, a state of life such as the number of health points, equipment, etc.), a game scene, whether or not a predetermined operation has been performed on a controller, etc.

Further, in the second example, the player character 130 moves to left or right with a state (first state) in which its left hand is on the wall object 136 and a state (second state) in which its right hand is on the wall object 136 alternating. In another exemplary embodiment, another state (third state) (e.g., a state in which both hands are on the wall object 136 or a state in which both hand are in a floating state) may exist between the state in which the left hand is on the wall object 136 and the state in which the right hand is on the wall object 136. In this case, the left controller 3 may be caused to vibrate strongly in the state in which the left hand is on the wall object 136, the right controller 4 may be caused to vibrate strongly in the state in which the right hand is on the wall object 136, and none of the left and right controllers 3 and 4 may be caused to vibrate in the third state. Alternatively, the left controller 3 may be caused to vibrate strongly in the state in which the left hand is on the wall object 136, and even when the state subsequently transitions to the third state, the left controller 3 may be caused to continue to vibrate strongly in the third state, and when the right hand is subsequently on the wall object 136, the right controller 4 may be caused to vibrate strongly.

Further, in the above exemplary embodiment, it is assumed that the vibration control signals are output, corresponding to a frame of an animation that is to be displayed. That is, it is determined how the left and right controllers 3 and 4 are to vibrate, based on the number of frames that have been displayed since the start of playback of an animation. In another exemplary embodiment, the vibration control signals may be generated and output based on the result of determination by the processor of whether an operation object is in the first state or in the second state. For example, in the first example, the vibration control signals may be generated based on the result of contact determination of whether or not the right or left hand of the player character 130 is on the wall object 136. Further, in the second example, the vibration control signals may be generated based on the result of contact determination of whether or not the right or left hand of the player character 130 is on the upper end portion of the wall object 136. Further, in the third example, it may be determined whether or not a paw of the animal object 140 is on the ground object 135, by contact determination between that paw and the ground object 135.

Further, in the above exemplary embodiment, the left and right controllers 3 and 4 are caused to vibrate according to the left-or-right state of an operation object (e.g., the state in which the left or right hand of the player character 130 is put on the wall object 136, and the state in which a left or right paw of the animal object 140 is on the ground object 135). In another exemplary embodiment, for example, the left and right controllers 3 and 4 may be caused to vibrate according to an upper-or-lower state of an operation object, instead of or in addition to the left-or-right state of the operation object. For example, in a case where there are a state in which an upper body of an operation object is in contact with another object and a state in which a lower body of the operation object is in contact with another object, a first controller may be caused to vibrate more strongly when the upper body is in contact with another object, and a second controller may be caused to vibrate more strongly when the lower body is in contact with another object.

Further, in the above exemplary embodiment, it is assumed that the left and right controllers 3 and 4 are attachable and detachable to and from the main body apparatus 2. In another exemplary embodiment, the left and right controllers 3 and 4 may be integrated with the main body apparatus 2 so that the left and right controllers 3 and 4 are not detachable from the main body apparatus 2.

Further, in the above exemplary embodiment, it is assumed that an operation object is operated using the left and right controllers 3 and 4 that are attachable and detachable to and from the main body apparatus 2, and the left and right controllers 3 and 4 are caused to vibrate. An operation device for operating an operation object is not limited to the above left and right controllers 3 and 4. For example, an operation device having a left portion that is a counterpart of the left controller 3 and a right portion that is a counterpart of the right controller 4, may be used. The operation device may be connected to the main body apparatus 2 wirelessly or through a wired connection. The operation device transmits operation data corresponding to an operation to the main body apparatus 2, and the main body apparatus 2 transmits the above first and second vibration control signals to the operation device. The left portion of the operation device is provided with counterparts of the stick 32, the buttons 103, and the vibrator 107 of the left controller 3, and the right portion of the operation device is provided with counterparts of the stick 52, the buttons 113, and the vibrator 117 of the right controller 4. In this case, the left portion of the operation device functions as the left controller 3 (first operating portion), and the right portion of the operation device functions as the right controller 4 (second operating portion). The left and right portions of the operation device vibrate in a manner similar to that of the left and right controllers 3 and 4.

Further, in the above exemplary embodiment, it is assumed that the main body apparatus 2 functions as the character control section 200, the image generation section 201, the vibration signal generator 202, and the vibration signal transmission section 203. In another exemplary embodiment, the main body apparatus 2 and the left and right controllers 3 and 4 may function as the character control section 200, the image generation section 201, the vibration signal generator 202, and the vibration signal transmission section 203. For example, the main body apparatus 2 and the left and right controllers 3 and 4 may function as the vibration signal generator 202 and the vibration signal transmission section 203. For example, the main body apparatus 2 may transmits a signal indicating a state of an operation object to the left and right controllers 3 and 4, and based on the signal, the left and right controllers 3 and 4 may generate vibration control signals for causing the vibrators 107 and 117 to vibrate, and outputs the vibration control signals to the vibrators 107 and 117.

Further, the above game may be played in a game system in which a plurality of devices are connected together via a network (e.g., the Internet or a LAN). For example, a terminal and a server may be connected together via the Internet to constitute the above system. In this case, for example, the terminal may be provided with operation devices that are counterparts of the left and right controllers 3 and 4, and a display device, and the server may be provided with the character control section 200, the image generation section 201, the vibration signal generator 202, and the vibration signal transmission section 203. The terminal transmits, to the server, operation data corresponding to an operation performed on the operation device by a player. The server controls a player character, etc., based on the operation data to generate an image, and generates a vibration control signal, according to a state of the player character. Thereafter, the terminal receives the image and the vibration control signal from the server, and displays the image on the display device, and causes the operation device to vibrate.

Further, in the above exemplary embodiment, it is assumed that the above game is played in the game system 1. Alternatively, the above game may be played in other systems (or devices), such as a personal computer, a smartphone, a tablet terminal, etc. Further, in the game system 1 or other systems, other applications may be executed in addition to the above game.

In the foregoing, the exemplary embodiment has been described. The above description of the exemplary embodiment is merely illustrative. Various modifications and changes may be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
   a first vibrator configured to vibrate with a strength based on a first vibration signal;
   a second vibrator configured to vibrate with a strength based on a second vibration signal; and
   at least one processor configured to at least:
   generate the first vibration signal for causing the first vibrator to vibrate, and generate the second vibration signal for causing the second vibrator to vibrate; and
   cause an operation object to perform a motion including a first state and a second state, in a virtual space, based on an operation performed by a user, wherein the first state corresponds to a first interaction between the operation object and a vibration-enabling object and the second state corresponds to a second interaction between the operation object and the vibration-enabling object,
   wherein when the operation object is in the first state of the motion, the first and second vibration signals are generated to cause the first vibrator to vibrate more strongly than the second vibrator, and
   wherein when the operation object is in the second state of the motion, the first and second vibration signals are generated to cause the second vibrator to vibrate more strongly than the first vibrator.

2. The information processing system according to claim 1, wherein in the motion, the operation object repeatingly alternates between entering the first and second states.

3. The information processing system according to claim 1, wherein the at least one processor is further configured to at least cause the operation object to be in the first or second state, according to at least one of a state of the virtual space, a state of the operation object, and an operation performed by the user.

4. The information processing system according to claim 1, wherein the at least one processor is further configured to at least generate the first and second vibration signals such that the first and second vibrators each is caused to vibrate with a strength corresponding to a positional relationship between a virtual vibration source provided in the virtual space and the operation object or a virtual camera.

5. The information processing system according to claim 4, wherein when the first vibration signal generated based on the motion of the operation object and the first vibration signal generated based on the virtual vibration source are simultaneously generated, the at least one processor is further configured to at least combine the first vibration signals, and when the second vibration signal generated based on the motion of the operation object and the second vibration signal generated based on the virtual vibration source are simultaneously generated, the at least one processor is further configured to at least combine the second vibration signals.

6. The information processing system according to claim 4, wherein the virtual vibration source is the vibration-enabling object.

7. The information processing system according to claim 1, wherein the at least one processor is further configured to at least generate the first and second vibration signals so as to vary according to a location of the operation object in the virtual space.

8. The information processing system according to claim 1, further comprising:
a first operating portion; and a second operating portion, wherein:
the first vibrator is included in the first operating portion,
the second vibrator is included in the second operating portion, and
the at least one processor is further configured to at least control the operation object, based on an operation performed on the first operating portion and/or the second operating portion.

9. The information processing system according to claim 8, wherein:
the first operating portion is operable by the left hand of the user,
the second operating portion is operable by the right hand of the user,
the operation object is a player character object controllable by the user,
when an event occurs on a left portion of the player character object in the virtual space, the at least one processor is further configured to at least generate the first and second vibration signals such that the first vibrator is caused to vibrate more strongly than the second vibrator, and
when an event occurs on a right portion of the player character object in the virtual space, the at least one processor is further configured to at least generate the first and second vibration signals such that the second vibrator is caused to vibrate more strongly than the first vibrator.

10. The information processing system according to claim 1, wherein the first and second interactions are independent of a location of the operation object in the virtual space.

11. A non-transitory storage medium having stored therein an information processing program executable by a computer of an information processing apparatus for controlling vibrations of a first vibrator and a second vibrator each configured to vibrate with a strength based on a vibration signal, the program when executed causing the computer to execute at least:
generating a first vibration signal for causing the first vibrator to vibrate, and generating a second vibration signal for causing the second vibrator to vibrate; and
causing an operation object to perform a motion including a first state and a second state, in a virtual space, based on an operation performed by a user, wherein the first state corresponds to a first interaction between the operation object and a vibration-enabling object and the second state corresponds to a second interaction between the operation object and the vibration-enabling object;
wherein, in the vibration signal generation:
when the operation object is in the first state of the motion, the first and second vibration signals are generated to cause the first vibrator to vibrate more strongly than the second vibrator, and
when the operation object is in the second state of the motion, the first and second vibration signals are generated to cause the second vibrator to vibrate more strongly than the first vibrator.

12. The non-transitory storage medium according to claim 11, wherein in the motion, the operation object repeatingly alternates between entering the first and second states.

13. The non-transitory storage medium according to claim 11, wherein the operation object is controlled so as to be in the first or second state, according to at least one of a state of the virtual space, a state of the operation object, and an operation performed by the user.

14. The non-transitory storage medium according to claim 11, wherein the first and second vibration signals are generated to cause first and second vibrators each to vibrate with a strength corresponding to a positional relationship between a virtual vibration source provided in the virtual space and the operation object or a virtual camera.

15. The non-transitory storage medium according to claim 14, wherein the program, when executed, further causing the computer to at least execute:
when the first vibration signal generated based on the motion of the operation object and the first vibration signal generated based on the virtual vibration source are simultaneously generated, combining the first vibration signals, and
when the second vibration signal generated based on the motion of the operation object and the second vibration signal generated based on the virtual vibration source are simultaneously generated, combining the second vibration signals.

16. The non-transitory storage medium according to claim 11, wherein the first and second vibration signals are generated so as to vary according to a location of the operation object in the virtual space.

17. The non-transitory storage medium according to claim 11, wherein:
the first vibrator is included in a first operating portion,
the second vibrator is included in a second operating portion, and the operation object is controllable, based on an operation performed on the first operating portion and/or the second operating portion.

18. The non-transitory storage medium according to claim 11, wherein:
the first operating portion is operable by the left hand of the user,
the second operating portion is operable by the right hand of the user,
the operation object is a player character object controllable by the user,
when an event occurs on a left portion of the player character object in the virtual space, the first and second vibration signals are generated to cause the first vibrator to vibrate more strongly than the second vibrator, and
when an event occurs on a right portion of the player character object in the virtual space, the first and second vibration signals are generated to cause the second vibrator to vibrate more strongly than the first vibrator.

19. An information processing apparatus for controlling a first vibrator and a second vibrator each configured to vibrate with a strength based on a vibration signal, comprising:
at least one processor configured to at least:
generate a first vibration signal for causing the first vibrator to vibrate, and generate a second vibration signal for causing the second vibrator to vibrate; and
cause an operation object to perform a motion including a first state and a second state, in a virtual space, based on an operation performed by a user, wherein the first state corresponds to a first interaction between the operation object and a vibration-related object and the second state corresponds to a second interaction between the operation object and the vibration-related object,
wherein when the operation object is in the first state of the motion, the first and second vibration signals are generated to cause the first vibrator to vibrate more strongly than the second vibrator, and
wherein when the operation object is in the second state of the motion, the first and second vibration signals are generated to cause the second vibrator to vibrate more strongly than the first vibrator.

20. The information processing apparatus according to claim 19, wherein in the motion, the operation object repeatingly alternates between entering the first and second states.

21. The information processing apparatus according to claim 19, wherein the at least one processor is further configured to at least cause the operation object to be in the first or second state, according to at least one of a state of the virtual space, a state of the operation object, and an operation performed by the user.

22. The information processing apparatus according to claim 19, wherein the at least one processor is further configured to at least generate the first and second vibration signals such that the first and second vibrators each is caused to vibrate with a strength corresponding to a positional relationship between a virtual vibration source provided in the virtual space and the operation object or a virtual camera.

23. The information processing apparatus according to claim 22, wherein when the first vibration signal generated based on the motion of the operation object and the first vibration signal generated based on the virtual vibration source are simultaneously generated, the at least one processor is further configured to at least combine the first vibration signals, and when the second vibration signal generated based on the motion of the operation object and the second vibration signal generated based on the virtual vibration source are simultaneously generated, the at least one processor is further configured to at least combine the second vibration signals.

24. An information processing method for use in an information processing system having a first vibrator configured to vibrate with a strength based on a first vibration signal and a second vibrator configured to vibrate with a strength based on a second vibration signal, the method comprising:
generating the first vibration signal for causing the first vibrator to vibrate, and generating the second vibration signal for causing the second vibrator to vibrate; and
causing an operation object to perform a motion including a first state and a second state, in a virtual space, based on an operation performed by a user, wherein the first state corresponds to a first interaction between the operation object and a vibration-enabling object and the second state corresponds to a second interaction between the operation object and the vibration-enabling object;
wherein when the operation object is in the first state of the motion, the first and second vibration signals are generated to cause the first vibrator to vibrate more strongly than the second vibrator, and
wherein when the operation object is in the second state of the motion, the first and second vibration signals are generated to cause the second vibrator to vibrate more strongly than the first vibrator.

25. The information processing method according to claim 24, wherein in the motion, the operation object repeatingly alternates between entering the first and second states.

26. The information processing method according to claim 24, wherein the operation object is controlled so as to be in the first or second state, according to at least one of a state of the virtual space, a state of the operation object, and an operation performed by the user.

27. The information processing method according to claim 24, further comprising generating the first and second vibration signals such that the first and second vibrators each vibrate with a strength corresponding to a positional relationship between a virtual vibration source provided in the virtual space and the operation object or a virtual camera.

28. The information processing method according to claim 27, further comprising:
when the first vibration signal generated based on the motion of the operation object and the first vibration signal generated based on the virtual vibration source are simultaneously generated, combining the first vibration signals, and
when the second vibration signal generated based on the motion of the operation object and the second vibration signal generated based on the virtual vibration source are simultaneously generated, combining the second vibration signals.

* * * * *